(12) United States Patent
Yokoyama et al.

(10) Patent No.: US 9,362,587 B2
(45) Date of Patent: Jun. 7, 2016

(54) RECTANGULAR BATTERY

(75) Inventors: Tomohiko Yokoyama, Osaka (JP);
Kazuki Endo, Osaka (JP); Masato Fujikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 657 days.

(21) Appl. No.: 13/576,871

(22) PCT Filed: Dec. 15, 2010

(86) PCT No.: PCT/JP2010/007287
§ 371 (c)(1),
(2), (4) Date: Aug. 2, 2012

(87) PCT Pub. No.: WO2011/096035
PCT Pub. Date: Aug. 11, 2011

(65) Prior Publication Data
US 2012/0301757 A1    Nov. 29, 2012

(30) Foreign Application Priority Data

Feb. 5, 2010    (JP) .................................. 2010-023913

(51) Int. Cl.
| | |
|---|---|
| *H01M 4/00* | (2006.01) |
| *H01M 2/36* | (2006.01) |
| *H01M 10/04* | (2006.01) |
| *H01M 2/02* | (2006.01) |
| *H01M 2/26* | (2006.01) |

(Continued)

(52) U.S. Cl.
CPC ............ *H01M 10/0431* (2013.01); *H01M 2/02* (2013.01); *H01M 2/263* (2013.01); *H01M 10/052* (2013.01); *H01M 10/0587* (2013.01); *H01M 2002/0205* (2013.01); *Y02T 10/7011* (2013.01)

(58) Field of Classification Search
None
See application file for complete search history.

(56) References Cited

U.S. PATENT DOCUMENTS 6,143,442 A     11/2000 Takahashi et al.
6,455,198 B1 *   9/2002 Kitoh .......................... 429/231.1
(Continued)

FOREIGN PATENT DOCUMENTS

JP    08-153508 A    6/1996
JP    09-259926 A    10/1997
(Continued)

OTHER PUBLICATIONS

International Search Report issued in International Patent Application No. PCT/JP2010/007287 dtaed Mar. 22, 2011.
(Continued)

*Primary Examiner* — Barbara Gilliam
*Assistant Examiner* — Adam A Arciero
(74) *Attorney, Agent, or Firm* — McDermott Will & Emery LLP

(57) ABSTRACT

In a rectangular battery, a lead 9L connected to an electrode plate having a first polarity is connected to a battery case 1 which is an external terminal having the first polarity. A lead 11L connected to an electrode plate having a second polarity is connected to an external terminal 25 having the second polarity, through a connection plate 29. A distance between the battery case 1 and the connection plate 29 at at least one end of the battery case 1 in a long-side direction is equal to or less than the half of the width of the battery case 1 in a short-side direction thereof.

9 Claims, 13 Drawing Sheets

(51) Int. Cl.
  *H01M 10/0587* (2010.01)
  *H01M 10/052* (2010.01)

(56) References Cited

U.S. PATENT DOCUMENTS

| 2005/0112455 | A1* | 5/2005 | Marubayashi et al. ............ H01M 2/1241 429/56 |
| 2006/0263684 | A1 | 11/2006 | Song |
| 2009/0317665 | A1 | 12/2009 | Maeng et al. |

FOREIGN PATENT DOCUMENTS

| JP | 10-261427 A | | 9/1998 |
| JP | 10-261429 A | | 9/1998 |
| JP | 2004-303447 A | | 10/2004 |
| JP | 2005-158649 A | | 6/2005 |
| JP | 2006-080062 A | | 3/2006 |
| JP | 2008-130458 A | | 6/2008 |
| JP | 2010003690 A | * | 1/2010 |

OTHER PUBLICATIONS

Chinese Office Action and Search Report issued in Chinese Application No. 201080063067.X dated May 5, 2014, with English Translation of Search Report.

English Translation of Search Report issued in Chinese Office Action dated Aug. 17, 2015 in corresponding Chinese Patent Application No. 201080063067.X.

* cited by examiner

|  | FIRST BATTERY | SECOND BATTERY | THIRD BATTERY | FOURTH BATTERY | FIFTH BATTERY | SIXTH BATTERY | SEVENTH BATTERY | EIGHTH BATTERY | NINTH BATTERY | TENTH BATTERY |
|---|---|---|---|---|---|---|---|---|---|---|
| FIRST EXAMPLE | 63°C | 46°C | 48°C | 45°C | 51°C | 60°C | 49°C | 45°C | 44°C | 49°C |
| SECOND EXAMPLE | 41°C | 45°C | 46°C | 45°C | 42°C | 42°C | 47°C | 46°C | 44°C | 42°C |
| THIRD EXAMPLE | 49°C | 61°C | 49°C | 44°C | 61°C | 52°C | 49°C | 48°C | 46°C | 64°C |
| FOURTH EXAMPLE | 47°C | 45°C | 50°C | 64°C | 61°C | 50°C | 44°C | 49°C | 62°C | 47°C |
| COMPARATIVE EXAMPLE | 94°C | 87°C | 93°C | 98°C | 86°C | 99°C | 91°C | 92°C | 95°C | 84°C |

RECTANGULAR BATTERY

RELATED APPLICATIONS

This application is the U.S. National Phase under 35 U.S.C. §371 of International Application No. PCT/JP2010/007287, filed on Dec. 15, 2010, which in turn claims the benefit of Japanese Application No. 2010-023913, filed on Feb. 5, 2010, the disclosures of which Applications are incorporated by reference herein.

TECHNICAL FIELD

The present invention relates to a rectangular battery.

BACKGROUND ART

In a rectangular battery (hereinafter may be simply referred to as a "battery"), an electrode group and an electrolyte are accommodated in a battery case made of, e.g., metal. The electrode group is configured such that a positive electrode and a negative electrode are wounded or stacked with a separator being interposed between the positive and negative electrodes. The separator electrically insulates the positive and negative electrodes from each other, and holds the electrolyte. An opening is formed in the battery case, and is sealed by a sealing plate.

The sealing plate has the same polarity as that of the battery case. A through-hole is formed in a thickness direction of the sealing plate, and a terminal part having a polarity different from that of the battery case is inserted into the through-hole through a gasket. This electrically insulates the sealing plate and the terminal part from each other.

When great pressure which can deform the battery case is applied from an outside of the battery, the electrode group is deformed, and the separator is damaged. Thus, internal short-circuit occurs. When the internal short-circuit occurs, short-circuit current flows, and therefore Joule heat is generated. This results in heat generation of the battery, and, in some cases, results in overheating. In particular, a lithium ion secondary battery has a high energy density, prevention of overheating and improvement of safety have been required for the lithium ion secondary battery. In, e.g., Patent Documents 1-3, the following batteries have been proposed.

In the battery described in Patent Documents 1 and 2, a short-circuit unit is provided, which includes at least a first conductive unit which is formed of a conductor electrically connected to a positive electrode, a second conductive unit which is formed of a conductor electrically connected to a positive electrode, and an insulating holding unit configured to hold the first and second conductive units in a non-electric-contact state.

The battery described in Patent Document 3 has the structure in which, when mechanical pressure is applied toward an inside of the battery, a battery case and a current collector part (no active material is provided on the current collector part) positioned on the outermost of the electrode group come into contact with each other to generate electric short-circuit.

CITATION LIST

Patent Document

PATENT DOCUMENT 1: Japanese Patent Publication No. H10-261427

PATENT DOCUMENT 2: Japanese Patent Publication No. H10-261429

PATENT DOCUMENT 3: Japanese Patent Publication No. H09-259926

SUMMARY OF THE INVENTION

Technical Problem

However, if the battery includes the insulating holding unit as in Patent Documents 1 and 2, a dead space (internal space of the battery case where the electrode group is not arranged) is increased, resulting in a decrease in energy density.

In addition, in the case where the current collector part to which no active material is provided is provided on the outermost of the electrode group as in Patent Document 3, the dead space is also increased, resulting in the decrease in energy density.

In the rectangular battery, the battery case is in a rectangular shape as viewed in a cross section. Thus, when a certain load is applied to the rectangular battery, the battery is more likely to be deformed in the case where the load is applied from an outer side in a long-side direction of the battery case as compared to the case where the load is applied from an outer side in a short-side direction of the battery case.

The present invention has been made in view of the foregoing, and it is an objective of the present invention to prevent a decrease in capacity and prevent overheating of a battery even when a load is applied from an outer side in a long-side direction of a battery case.

Solution to the Problem

A rectangular battery of the present invention includes a battery case accommodating, together with an electrolyte, an electrode group configured such that an electrode plate having a first polarity and an electrode plate having a second polarity are wounded with a porous insulator being interposed therebetween. A lead connected to the electrode plate having the first polarity is connected to the battery case which is an external terminal having the first polarity. A lead connected to the electrode plate having the second polarity is, through a connection plate provided between a sealing plate sealing an opening of the battery case and the electrode group, connected to an external terminal provided on the sealing plate and having the second polarity. The battery case is in a rectangular shape as viewed in a cross section. A distance between the battery case and the connection plate at at least one end of the battery case in a long-side direction thereof is equal to or less than a half of a width of the battery case in a short-side direction thereof.

When great force which can deform the battery case is applied to the rectangular battery of the present invention from an outer side in the long-side direction of the battery case, the battery case and the connection plate come into contact with each other before the electrode group is deformed across the entirety thereof. Since the battery case and the connection plate have different polarities, internal short-circuit occurs between the battery case and the connection plate. No active material is provided on the battery case and the connection plate, thereby preventing concentration of short-circuit current on a positive electrode active material or a negative electrode active material.

In addition, since the connection plate is provided between the sealing plate and the electrode group, a dead space can be used.

The present inventor considers that the "width of the battery case in a short-side direction thereof" means not only the internal width (an "internal case thickness" described in embodiments) of the battery case in the short-side direction thereof, but also the external width (an "external case thickness" described in the embodiments) of the battery case in the short-side direction thereof. This is because the thickness of the battery case itself (difference between the internal width of the battery case in the short-side direction thereof and the external width of the battery case in the short-side direction thereof) is extremely smaller than the internal width of the battery case in the short-side direction thereof in most cases.

Advantages of the Invention

In the present invention, a decrease in capacity can be prevented, and overheating of the battery can be prevented even when great pressure which can deform the battery case is applied to the battery from the outer side in the long-side direction of the battery case.

DESCRIPTION OF EMBODIMENTS

Figure 1:
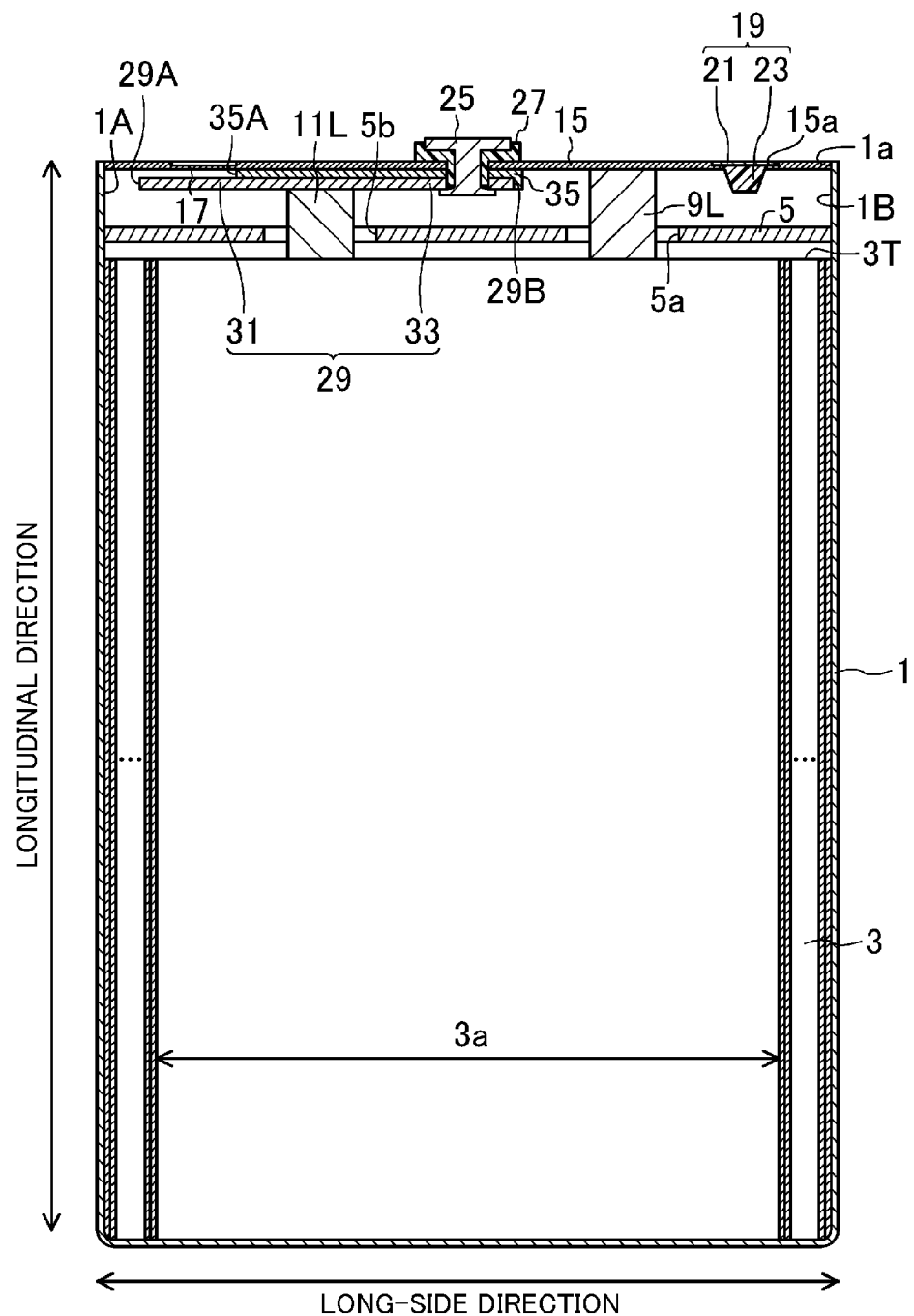
FIG. 1 is a longitudinal sectional view of a rectangular battery of a first embodiment of the present invention.

Embodiments of the present invention will be described in detail below with reference to drawings. Note that the present invention is not limited to the embodiments described below.

The same reference numerals will be used to represent equivalent elements. A vertical direction described below indicates a vertical direction in the drawings, and is not an absolute vertical direction.

<<First Embodiment of the Invention>>

Figure 2:
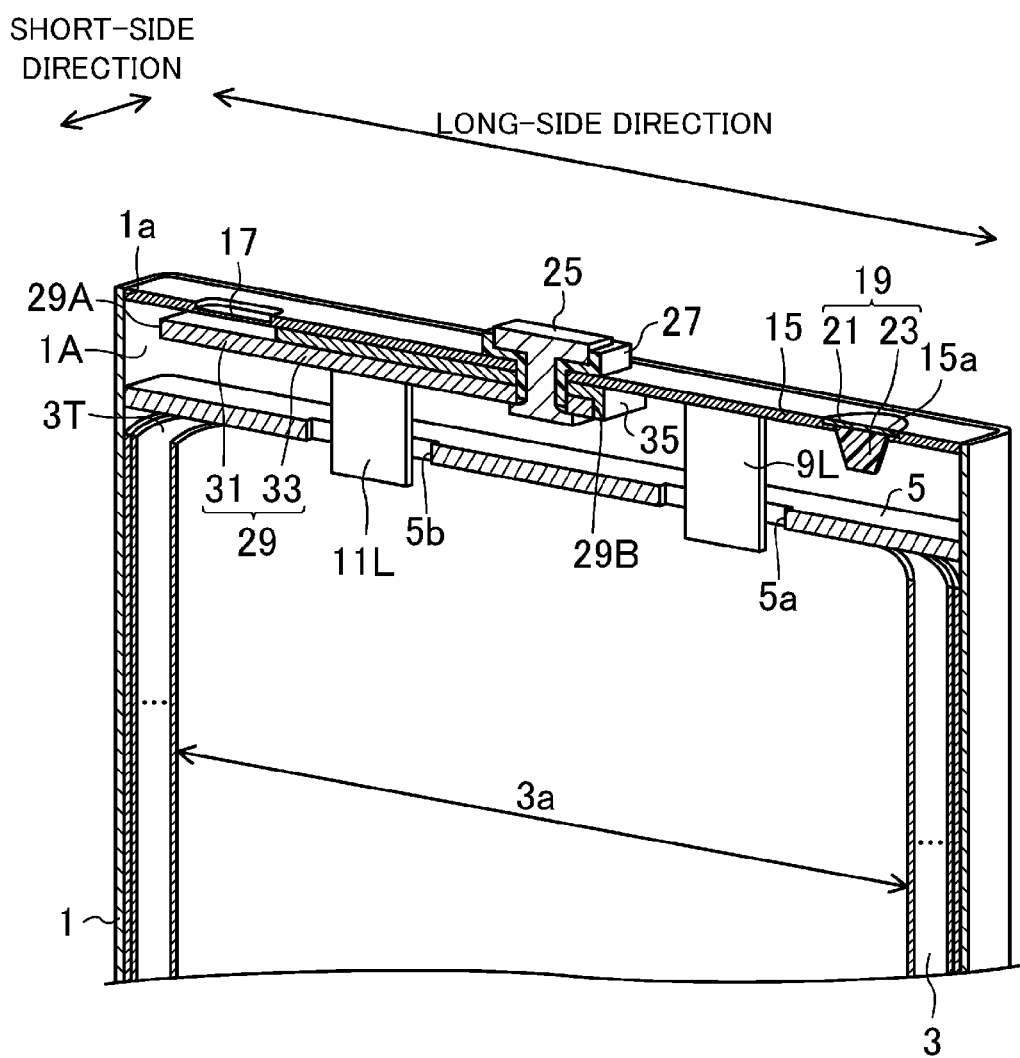
FIG. 2 is a longitudinal sectional perspective view of the rectangular battery of the first embodiment of the present invention.

FIG. 1 is a longitudinal sectional view of a rectangular battery of a first embodiment of the invention. FIG. 2 is a longitudinal sectional perspective view of the rectangular battery of the present embodiment.

In the rectangular battery of the present embodiment, an electrode group 3 and an electrolyte (not shown in the figure) are accommodated in a battery case 1. The electrode group 3 is configured such that a positive electrode plate 9 and a negative electrode plate 11 are wounded with a porous insulator 13 being interposed between the positive electrode plate 9 and the negative electrode plate 11 (see FIG. 5). A lead (positive electrode lead) 9L is connected to the positive electrode plate 9, and the positive electrode lead 9L is connected to the battery case 1 through a sealing plate 15 sealing an opening 1a of the battery case 1. A lead (negative electrode lead) 11L is connected to the negative electrode plate 11, and the negative electrode lead 11L is connected to a terminal part 25 through a connection plate 29 arranged between the sealing plate 15 and the electrode group 3. As described above, the battery case 1 serves as an external positive electrode terminal, and the terminal part 25 serves as an external negative electrode terminal. The details are as follows.

The battery case 1 is a closed-end case which opens at one end (upper end as viewed in FIG. 1) in a longitudinal direction and is closed at the other end (lower end as viewed in FIG. 1) in the longitudinal direction. In addition, the battery case 1 is in a rectangular shape as viewed in a cross section. A long-side direction of the battery case in the cross section is hereinafter referred to as a "long-side direction," and a short-side direction of the battery case in the cross section is hereinafter referred to as a "short-side direction."

Figure 5:
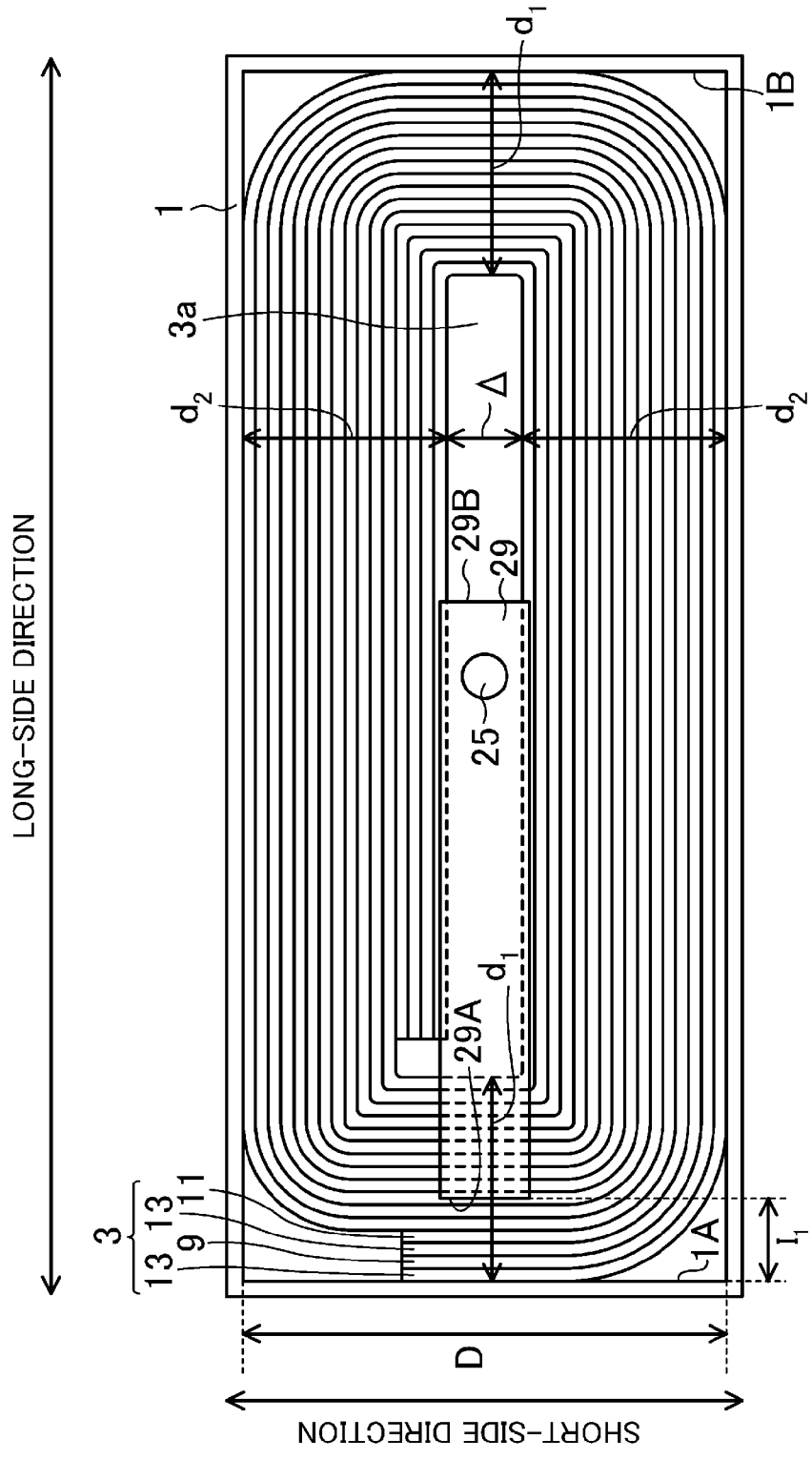
FIG. 5 is a plan view of the rectangular battery of the first embodiment of the present invention.

The electrode group 3 is in a cylindrical shape having an oval cross section (see FIG. 5). In the battery case 1, a longitudinal direction of the electrode group 3 is substantially parallel to the longitudinal direction of the battery case 1. In addition, a long-axis direction of the electrode group 3 is substantially parallel to the long-side direction of the battery case 1, and a short-axis direction of the electrode group 3 is substantially parallel to the short-side direction of the battery case 1. An upper insulating plate 5 is provided above the electrode group 3.

The positive electrode plate 9 has, in part thereof in the longitudinal direction, an exposed part (not shown in the figure) of a positive electrode current collector (not shown in the figure) exposed from a positive electrode active material layer (not shown in the figure). The positive electrode lead 9L extends from above the exposed part toward an opening-side end surface 3T of the electrode group 3. The positive electrode lead 9L is drawn from the opening-side end surface 3T, and extends toward the sealing plate 15 through a first through-hole 5a of the upper insulating plate 5. One end of the positive electrode lead 9L is connected to the exposed part of the positive electrode plate 9, and the other end of the positive electrode lead 9L is connected to an inner surface of the sealing plate 15.

The negative electrode plate 11 has, in part thereof in the longitudinal direction, an exposed part (not shown in the figure) of a negative electrode current collector (not shown in the figure) exposed from a negative electrode active material layer (not shown in the figure). The negative electrode lead 11L extends from above the exposed part to the opening-side end surface 3T of the electrode group 3. The negative electrode lead 11L is drawn from the opening-side end surface 3T, and extends toward the connection plate 29 through a second through-hole 5b of the upper insulating plate 5. One end of the negative electrode lead 11L is connected to the exposed part of the negative electrode plate 11, and the other end of the negative electrode lead 11L is connected to a lower surface of the connection plate 29.

The sealing plate 15 extends in the long-side direction, and is formed in a substantially rectangular shape as viewed in the plane. The sealing plate 15 is fitted into the opening 1a of the battery case 1, and is welded to the periphery of the opening 1a.

A relatively-thin explosion-proof valve 17 is formed at one end of the sealing plate 15 in the long-side direction. When internal pressure of the rectangular battery exceeds a predetermined value, the explosion-proof valve 17 is ruptured to prevent a further increase in internal pressure of the rectangular battery.

An electrolyte injection hole 15a is formed at the other end of the sealing plate 15 in the long-side direction. The electrolyte injection hole 15a is a through-hole through which an electrolyte is supplied into the battery case 1, and a step part is formed in a side wall of the electrolyte injection hole 15a. The electrolyte injection hole 15a is closed by a plug 19 after the supply of the electrolyte into the battery case 1 is completed. The plug 19 includes a metal part 21 and a resin part 23. The metal part 21 is fitted into the electrolyte injection hole 15a so as to be positioned on an outer side in the longitudinal direction relative to the step part, and the resin part 23 is fitted into the electrolyte injection hole 15a such that part of the resin part 23 is positioned on an inner side in the longitudinal direction relative to the step part. The resin part 23 is arranged inside the battery case 1, and has a width smaller than that of the metal part 21. In addition, the width of the resin part 23 is decreased from the metal part 21 toward an inside of the battery case 1.

The terminal part 25 is provided at the substantially center of the sealing plate 15 in the long-side direction, and an insulating plate 35 and the connection plate 29 are provided in this order on the inner surface of the sealing plate 15. The terminal part 25 is provided so as to penetrate the sealing plate 15, the insulating plate 35, and the connection plate 29, and is provided on an outer surface of the sealing plate 15 and the lower surface of the connection plate 29. The sealing plate 15 and the terminal part 25 have different polarities. Thus, the terminal part 25 is provided on the outer surface of the sealing plate 15 through a gasket 27, and is provided so as to penetrate the sealing plate 15, the insulating plate 35, and the connection plate 29. On the other hand, the terminal part 25 and the connection plate 29 have the same polarity. Thus, the terminal part 25 is directly provided on the lower surface of the connection plate 29, and therefore is electrically connected to the connection plate 29.

The connection plate 29 extends in the long-side direction. Specifically, the connection plate 29 extends from a side slightly closer to the electrolyte injection hole 15a than the terminal part 25 is, toward an outer side in the long-side direction beyond the explosion-proof valve 17. A first end surface 29A of the connection plate 29 faces a first inner surface 1A of the battery case 1, and is positioned on the outer side in the long-side direction relative to a hollow part 3a of the electrode group 3 or at the substantially same position as that of the periphery of the hollow part 3a. A second end surface 29B of the connection plate 29 faces a second inner surface 1B of the battery case 1, and is positioned slightly closer to the plug 19 than the terminal part 25 is. The first inner surface 1A and the second inner surface 1B of the battery case 1 are inner surfaces of the case extending in the short-side direction.

The insulating plate 35 extends in the long-side direction. Specifically, the insulating plate 35 extends from the side slightly closer to the electrolyte injection hole 15a than the terminal part 25 is, toward a near side of the explosion-proof valve 17. A first end surface 35A of the insulating plate 35 faces the first inner surface 1A of the battery case 1, and is positioned on an inner side in the long-side direction relative to the first end surface 29A of the connection plate 29. Thus, the connection plate 29 includes an exposed part 31 exposed from the insulating plate 35, and a covered part 33 covered by the insulating plate 35. The insulating plate 35 covers the second end surface 29B of the connection plate 29.

Figure 3:
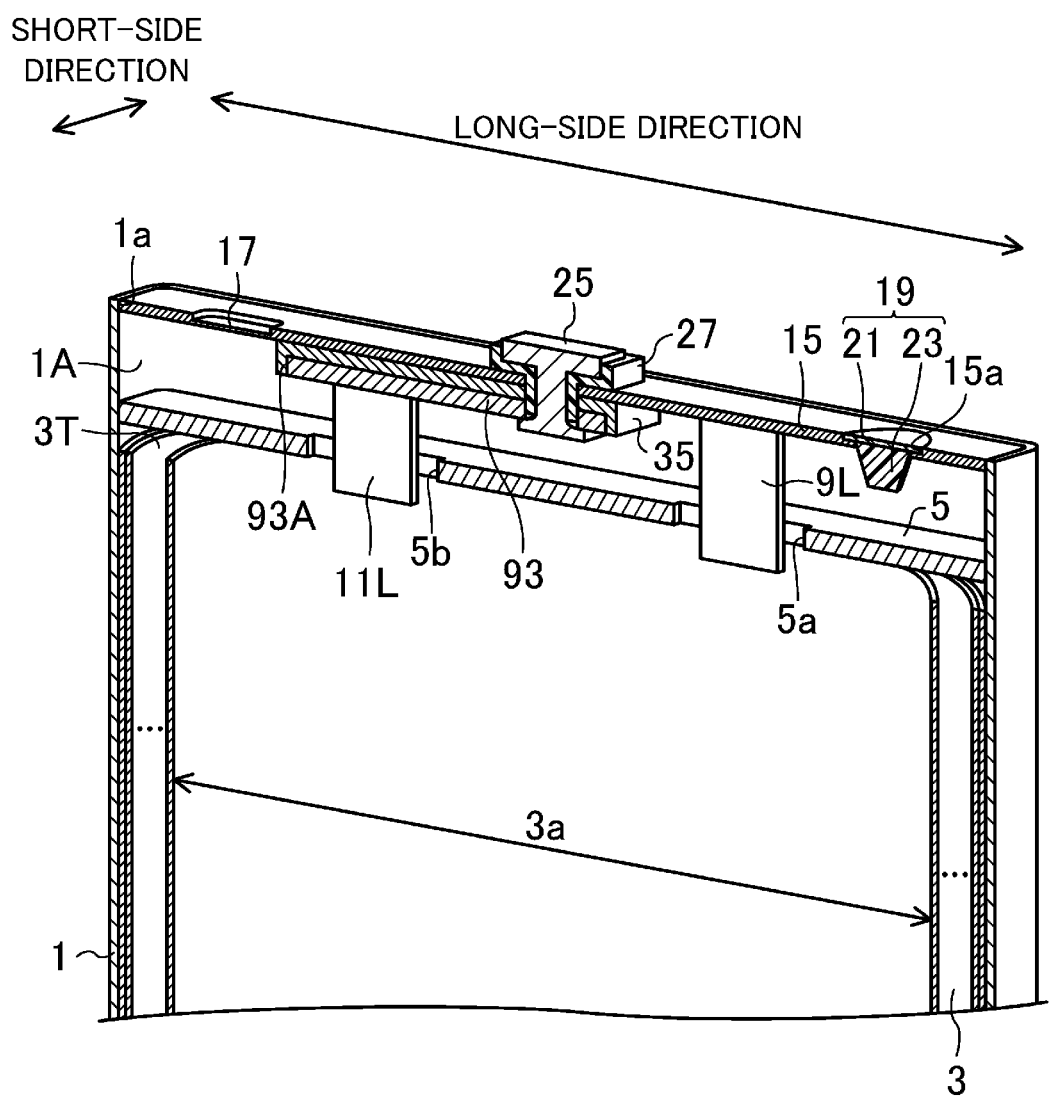
FIG. 3 is a longitudinal sectional perspective view of a conventional rectangular battery.
Figure 4:
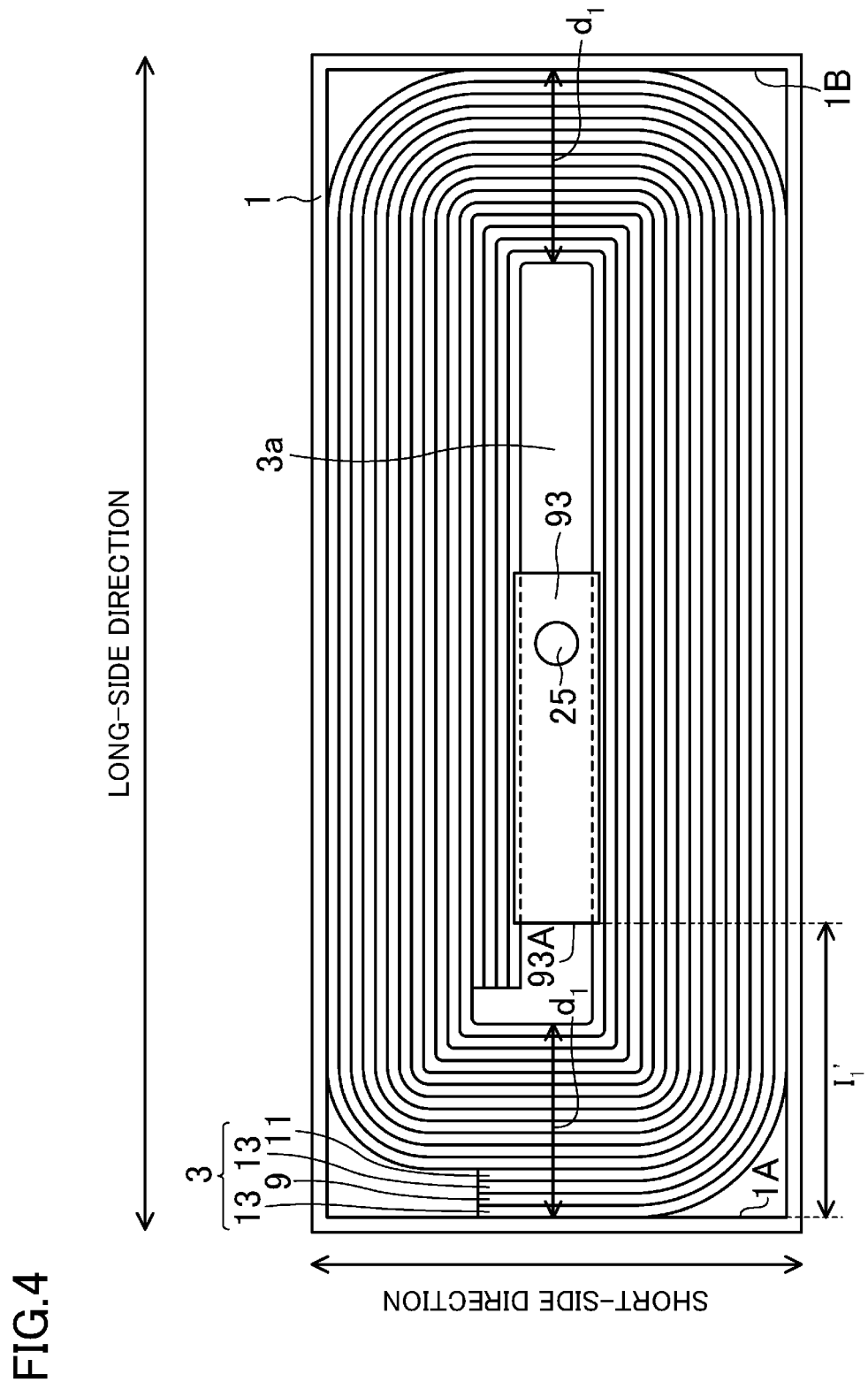
FIG. 4 is a plan view of the conventional rectangular battery.

In the rectangular battery of the present embodiment, the first end surface 29A of the connection plate 29 is positioned on the outer side in the long-side direction relative to the hollow part 3a of the electrode group 3 or at the substantially same position as that of the periphery of the hollow part 3a. On the other hand, in a conventional rectangular battery, a battery case and a connection plate are sufficiently apart from each other in a long-side direction. A configuration and advantages of the rectangular battery of the present embodiment will be described below in comparison with the conventional rectangular battery. FIG. 3 is a longitudinal sectional perspective view of the conventional rectangular battery. FIG. 4 is a plan view schematically illustrating the conventional rectangular battery. FIG. 5 is a plan view schematically illustrating the rectangular battery of the present embodiment. Needless to say, the thicknesses of the positive electrode plate 9, the negative electrode plate 11, and the porous insulator 13 are not limited to those illustrated in FIGS. 4 and 5. The number of turns of the electrode plate in the electrode group 3 is not limited to that illustrated in FIGS. 4 and 5. The shape of an end surface of the terminal part 25 is not limited to that illustrated in FIGS. 4 and 5. The dimensions indicated by $d_1$, $d_2$, and $\Delta$ are not limited to those illustrated in FIGS. 4 and 5. Note that $d_1$ may fall below $l_1'$ in FIG. 4, and may be equal to or greater than $l_1$ in FIG. 5. Since a smaller $\Delta$ results in a higher capacity of the rectangular battery, it is preferred that $\Delta$ is smaller. In FIGS. 4 and 5, the sealing plate 15 and the terminal part 25 are not shown.

In order to prevent an increase in current collecting resistance, the negative electrode lead 11L is generally arranged near the terminal part 25 in the long-side direction in the rectangular battery. Thus, in the conventional rectangular battery, the length of a connection plate 93 (connecting the negative electrode lead 11L and the terminal part 25 together) in the long-side direction is not necessarily increased, and it is only necessary that a first end surface 93A of the connection plate 93 is positioned slightly closer to the outer side in the long-side direction than the negative electrode lead 11L is. Consequently, the distance $l_1'$ (see FIG. 4) between the first inner surface 1A of the battery case 1 and the first end surface 93A of the connection plate 93 in the long-side direction is greater than the thickness $d_1$ of the electrode group 3 in the long-side direction.

If the connection plate 93 is further extended toward the first inner surface 1A of the battery case 1, the connection plate 93 is arranged below the electrolyte injection hole 15a, or is arranged below the explosion-proof valve 17. In the former, it is difficult to inject the electrolyte through the electrolyte injection hole 15a. If a hole communicating with the electrolyte injection hole 15a is formed in the connection plate 93, the electrolyte can be smoothly injected. However, this results in an increase in manufacturing cost of the connection plate 93. In the latter, it is difficult to rupture the explosion-proof valve 17 when the internal pressure of the rectangular battery exceeds the predetermined value. If a hole reaching the explosion-proof valve 17 is formed in the connection plate 93, the explosion-proof valve 17 can be smoothly ruptured upon the increase in internal pressure. However, this results in the increase in manufacturing cost of the connection plate 93. Considering the foregoing, it has been considered that it is only necessary that, in the conventional rectangular battery, the first end surface 93A of the connection plate 93 is positioned slightly closer to the outer side in the long-side direction than the negative electrode lead 11L is.

When great force is applied from an outside of the conventional rectangular battery illustrated in FIG. 4 and deforms the battery case 1, the electrode group 3 is deformed across the entirety thereof. Then, part of the porous insulator 13 is ruptured, and a positive electrode active material and a negative electrode active material locally come into contact with each other. Particularly when great pressure is applied to the conventional rectangular battery from the outer side in the long-side direction, the electrode group 3 is deformed greatly at both ends thereof in the long-side direction. Thus, at the both ends of the electrode group 3 in the long-side direction, part of the porous insulator 13 is ruptured, and the positive electrode active material and the negative electrode active material come into contact with each other. This generates internal short-circuit. As soon as the internal short-circuit occurs, extremely great current (short-circuit current) flows so as to be concentrated between the positive electrode active material and the negative electrode active material contacting each other, resulting in generation of Joule heat. Thus, at part of the electrode group 3 where the internal short-circuit occurs, a temperature instantaneously reaches a decomposition temperature of the positive electrode active material or the negative electrode active material, and therefore heat decomposition of the positive electrode active material or the negative electrode active material occurs. As a result, the battery may be overheated.

On the other hand, in the rectangular battery of the present embodiment, the first end surface 29A of the connection plate 29 is positioned on the outer side in the long-side direction relative to the hollow part 3a of the electrode group 3 or at the substantially same position as that of the periphery of the hollow part 3a. In other words, the distance (hereinafter referred to as a "distance between the first inner surface 1A and the first end surface 29A) $I_1$ between the first inner surface 1A of the battery case 1 and the first end surface 29A of the connection plate 29 in the long-side direction is equal to or less than the thickness $d_1$ of the electrode group 3 in the long-side direction. Thus, when great pressure is applied to the rectangular battery of the present embodiment from the outer side in the long-side direction and deforms the battery case 1, the first inner surface 1A of the battery case 1 and the first end surface 29A of the connection plate 29 come into contact with each other before the electrode group 3 is deformed across the entirety thereof. Since the battery case 1 and the positive electrode plate 9 have different polarities, short-circuit current flows between the battery case 1 and the connection plate 29 contacting each other, resulting in generation of Joule heat. In such a state, there is no positive electrode active material and no negative electrode active material at the first inner surface 1A of the battery case 1 and the first end surface 29A of the connection plate 29. This prevents short-circuit current from being concentrated on the positive electrode active material and the negative electrode active material, thereby reducing the heat decomposition of the positive electrode active material and the negative electrode active material. Consequently, the overheating of the battery can be prevented.

In addition to the foregoing, in the present embodiment, even if the battery case 1 is further deformed after the first inner surface 1A of the battery case 1 and the first end surface 29A of the connection plate 29 contact each other, the heat decomposition of the positive electrode active material and the negative electrode active material. Specifically, when the positive electrode active material and the negative electrode active material contact each other, short-circuit current already flows between the first inner surface 1A of the battery case 1 and the first end surface 29A of the connection plate 29 contacting each other. Rate-limiting of lithium dispersion in a non-aqueous electrolyte results in high polarization of the positive and negative electrodes of the rectangular battery. This reduces short-circuit current flowing between the positive electrode active material and the negative electrode active material contacting each other. Thus, the heat decomposition of the positive electrode active material and the negative electrode active material can be reduced, and therefore the overheating of the battery can be prevented.

Even if the distance $I_1$ between the first inner surface 1A and the first end surface 29A is substantially the same as the thickness $d_1$ of the electrode group 3 in the long-side direction, the heat decomposition of the positive electrode active material and the negative electrode active material can be reduced. Specifically, there is a small clearance between the first inner surface 1A of the battery case 1 and an outer surface of the electrode group 3. Thus, even if the distance $I_1$ between the first inner surface 1A and the first end surface 29A is substantially the same as the thickness $d_1$ of the electrode group 3 in the long-side direction, the first end surface 29A of the connection plate 29 is positioned slightly closer to the outer side in the long-side direction relative to the hollow part 3a of the electrode group 3. Consequently, since the first inner surface 1A of the battery case 1 and the first end surface 29A of the connection plate 29 come into contact with each other before the electrode group 3 is deformed across the entirety thereof, short-circuit current flowing between the positive electrode active material and the negative electrode active material can be reduced. As a result, the heat decomposition of the positive electrode active material and the negative electrode active material can be reduced, and therefore the overheating of the battery can be prevented.

As in the foregoing, if the distance $I_1$ between the first inner surface 1A and the first end surface 29A is equal to or less than the thickness $d_1$ of the electrode group 3 in the long-side direction, the overheating of the battery can be prevented even when the battery case 1 is deformed due to pressure applied from the outer side in the long-side direction. A relationship of the distance $I_1$ between the first inner surface 1A and the first end surface 29A with the width (hereinafter referred to as an "internal case thickness") D of the battery case 1 in the short-side direction will be described below with reference to FIG. 5. Note that application of pressure from the outer side in the long-side direction to the rectangular battery is hereinafter simply referred to as "pressure is applied" or "pressure application."

The thickness of the electrode group 3 is substantially uniform in a direction around the electrode group 3. Thus, the thickness $d_1$ of the electrode group 3 in the long-side direction is substantially the same as the thickness $d_2$ of the electrode group 3 in the short-side direction. Suppose that the thickness of the hollow part 3a of the electrode group 3 in the short-side direction is Δ. The internal case thickness D is represented by the following expression:

$$D=2d_2+\Delta=2d_1+\Delta$$

Thus, the thickness $d_1$ of the electrode group 3 in the long-side direction is represented by the following expression:

$$d_1=(D-\Delta)/2$$

Since Δ≈0 is preferred considering an increase in capacity of the rectangular battery, the thickness $d_1$ of the electrode group 3 in the long-side direction is as follows:

$$d_1 \leq D/2$$

As in the foregoing, if the distance $I_1$ between the first inner surface 1A and the first end surface 29A is equal to or less than the half of the internal case thickness D, the overheating of the battery can be prevented even when the battery case 1 is deformed due to the pressure application.

If Δ cannot be ignored (e.g., if the rectangular battery do not have a high capacity), the thickness $d_1$ of the electrode group 3 in the long-side direction is as follows:

$$d_1<D/2$$

That is, in the case where Δ cannot be ignored, even through the distance $I_1$ between the first inner surface 1A and the first end surface 29A is equal to or less than the half of the internal case thickness D, the first end surface 29A of the connection plate 29 may be positioned on the inner side in the long-side direction relative to the periphery of the hollow part 3a of the electrode group 3. Considering the foregoing, the distance $I_1$ between the first inner surface 1A and the first end surface 29A may be equal to or less than the half of the internal case thickness D, and is preferably equal to or less than the thickness $d_1$ of the electrode group 3 in the long-side direction.

A smaller distance $I_1$ between the first inner surface 1A and the first end surface 29A results in earlier timing at which the first inner surface 1A of the battery case 1 and the first end surface 29A of the connection plate 29 come into contact with each other upon the pressure application. However, a too small distance $I_1$ between the first inner surface 1A and the first end surface 29A results in a long length of the connection plate 29 in the long-side direction. Thus, there is a possibility that a cost for the rectangular battery is increased. In addition to the foregoing, there is a possibility that the first inner surface 1A of the battery case 1 and the first end surface 29A of the connection plate 29 accidentally contact each other due to vibration of the rectangular battery during, e.g., transport. Considering the foregoing, the distance $I_1$ between the first inner surface 1A and the first end surface 29A is preferably equal to or greater than the sum of the thickness of the positive electrode plate 9 and the thickness of the porous insulator 13.

As described above, in the present embodiment, the distance $I_1$ between the first inner surface 1A and the first end surface 29A is equal to or less than the half of the internal case thickness D. Thus, when great pressure which can deform the battery case 1 is applied to the rectangular battery, the first inner surface 1A of the battery case 1 and the first end surface 29A of the connection plate 29 come into contact with each other before the electrode group 3 is deformed across the entirety thereof. This prevents internal short-circuit from occurring between the positive electrode active material and the negative electrode active material, and therefore the overheating of the battery can be prevented.

The connection plate 29 is arranged between the sealing plate 15 and the opening-side end surface 3T of the electrode group 3, i.e., the connection plate 29 is arranged in the dead space. Thus, in the present embodiment, the distance $I_1$ between the first inner surface 1A and the first end surface 29A can be equal to or less than the half of the internal case thickness D without narrowing the internal space of the battery case 1 where the electrode group 3 is accommodated. As described above, in the present embodiment, in such a manner that the distance $I_1$ between the first inner surface 1A and the first end surface 29A is equal to or less than the half of the internal case thickness D, significant advantages can be realized, which are prevention of reduction in capacity of the rectangular battery and prevention of the overheating of the battery caused due to the pressure application.

Representative examples of materials of components forming the rectangular battery will be listed below.

The battery case 1, the positive electrode lead 9L, the sealing plate 15, and the metal part 21 of the plug 19 may be made of metal such as aluminum or an aluminum alloy. The battery case 1, the positive electrode lead 9L, the sealing plate 15, and the metal part 21 of the plug 19 may be made of the same material, or may be made of different materials. However, if the battery case 1, the positive electrode lead 9L, the sealing plate 15, and the metal part 21 of the plug 19 are made of the same material, the welding strength of the positive electrode lead 9L, the sealing plate 15, and the metal part 21 of the plug 19 to the battery case 1 by laser welding can be ensured.

In the positive electrode plate 9, the positive electrode active material layer is formed on one or both surfaces of the positive electrode current collector.

The positive electrode current collector is a substrate or foil made of a conductive material such as aluminum, carbon, or conductive resin. If the positive electrode current collector is the substrate, a plurality of holes may be formed in the substrate. In addition, the surface of the positive electrode current collector may be processed by using, e.g., carbon. The thickness of the positive electrode current collector is preferably equal to or greater than 1 μm and equal to or less than 500 μm, and is more preferably equal to or greater than 10 μm and equal to or less than 20 μm. Thus, the strength of the positive electrode plate can be maintained, and the weight of the positive electrode plate can be reduced.

The positive electrode active material layer contains the positive electrode active material, a conductive agent, a binder, etc. The positive electrode active material is, e.g., lithium-containing composite oxide represented by a general formula of $Li_xM_{1-x}O_2$ (M is, e.g., Co, Ni, or Mn). The specific lithium-containing composite oxide is, e.g., $LiCoO_2$, $LiNiO_2$ or $Li_2MnO_4$. The lithium-containing composite oxide also contains a phosphate compound such as $LiMePO_4$ or $Li_2MePO_4F$ (Me is at least one selected from Fe, Mn, Co, and Ni). Only one type of the positive electrode active material may be used, or two or more types of the positive electrode active material may be combined and used.

The conductive agent may be graphites such as natural graphite or artificial graphite, or may be carbon blacks such as acetylene black, Ketchen black, furnace black, lamp black, or thermal black. Only one type of the conductive agent may be used, or two or more types of the conductive agent may be combined and used.

The binder is, e.g., poly(vinylidene fluoride) (PVDF), polytetrafluoroethylene, polyethylene, polypropylene, aramid resin, polyamide, or polyimide. Only one type of the binder may be used, or two or more types of the binder may be combined and used.

The negative electrode lead 11L, the terminal part 25, and the connection plate 29 may be made of, e.g., nickel, copper, iron, or stainless. The negative electrode lead 11L, the terminal part 25, and the connection plate 29 may be made of the same material, or may be made of different materials. However, if the negative electrode lead 11L, the terminal part 25, and the connection plate 29 are made of the same material, the welding strength of the negative electrode lead 11L to the connection plate 29 by the laser welding can be ensured, and the welding strength of the terminal part 25 to the connection plate 29 by the laser welding can be ensured.

In the negative electrode plate 11, the negative electrode active material layer is formed on one or both surfaces of the negative electrode current collector.

The negative electrode current collector may be metal foil made of, e.g., stainless steel, nickel, copper, or titanium, or may be a thin film made of, e.g., carbon or conductive resin. The thickness of the negative electrode current collector is preferably equal to or greater than 1 μm and equal to or less than 500 μm, and is more preferably equal to or greater than 10 μm and equal to or less than 20 μm. Thus, the strength of the negative electrode plate can be maintained, and the weight of the negative electrode plate can be reduced.

The negative electrode active material layer contains the negative electrode active material. The negative electrode active material may be, e.g., a carbon material such as graphite, metal such as silicon or tin which is capable of reversibly inserting/extracting lithium ions, or a compound containing such metal. Only one type of the negative electrode active material may be used, or two or more types of the negative electrode active material may be combined and used. If the carbon material is selected as the negative electrode active material, the negative electrode active material layer preferably contains a binder other than the negative electrode active material. The binder may be the binder listed above. On the other hand, if the metal or the compound containing the metal is selected as the negative electrode active material, the negative electrode active material layer does not necessarily contain the binder.

The porous insulator 13 may be made of, e.g., polyethylene, polypropylene, a mixture of polyethylene and polypropylene, or a copolymer of ethylene and propylene, or may be formed by bonding insulating particles of, e.g., aluminum oxide together. The thickness of the porous insulator is, e.g., equal to or greater than 10 μm and equal to or less than 300 μm. A porosity (ratio of the volume of the holes to the volume of the porous insulator) in the porous insulator may be equal to or greater than 30% and equal to or less than 70%, and is preferably equal to or greater than 35% and equal to or less than 60%.

The upper insulating plate 5, the gasket 27, and the insulating plate 35 may be made of, e.g., polypropylene (PP), polyphenylene sulfide (PPS), tetrafluoroethylene perfluoroalkoxy vinyl ether copolymer (PFA), or poly(butylene terephthalate) (PBT). In addition, the resin part 23 of the plug 19 may be made of, e.g., ethylene-propylene-diene monomer (EPDM).

The non-aqueous electrolyte may be a non-aqueous liquid electrolyte containing a non-aqueous solvent and a substance dissolved in the non-aqueous solvent, or may be a polymer electrolyte containing a non-aqueous liquid electrolyte and a high-molecular compound.

The dissolved substance may be sodium containing lithium, such as $LiPF_6$, $LiBF_4$, $LiClO_4$, $LiAlCl_4$, $LiSbF_6$, LiSCN, $LiCF_3SO_3$, $LiN(CF_3CO_2)$, or $LiN(CF_3SO_2)_2$. Only one type of the dissolved substance may be used, or two or more types of the dissolved substance may be combined and used. The concentration of the dissolved substance is, e.g., equal to or greater than 0.5 mol/m$^3$ and equal to or less than 1 mol/m$^3$.

The non-aqueous solvent may be, e.g., ethylene carbonate, propylene carbonate, butylene carbonate, vinylene carbonate, dimethyl carbonate, diethyl carbonate, or ethyl methyl carbonate. Only one type of the non-aqueous solvent may be used, or two or more types of the non-aqueous solvent may be combined and used.

In the polymer electrolyte, the non-aqueous electrolyte is held by the high-molecular compound. The high-molecular compound is, e.g., PVDF, poly acrylnitorile, polyethylene oxide, polyvinyl chloride, polyacrylate, or poly(vinylidene fluoride-hexafluoropropylene).

The rectangular battery described above is produced in the following method. First, a positive electrode plate 9 to which a positive electrode lead 9L is connected and a negative electrode plate 11 to which a negative electrode lead 11L is connected are prepared. Next, the positive electrode plate 9 and the negative electrode plate 11 are arranged such that the positive electrode lead 9L and the negative electrode lead 11L extend in the same direction, and the positive electrode plate 9 and the negative electrode plate 11 are wounded with a porous insulator 13 being interposed between the positive electrode plate 9 and the negative electrode plate 11. At this point, an electrode group having a substantially circular cross section may be prepared and flattened, or the positive electrode plate 9, the negative electrode plate 11, and the porous insulator 13 may be wounded around a winding plate (having a rectangular cross section). The electrode group 3 produced in the foregoing manner is accommodated in a battery case 1, and then an upper insulating plate 5 is placed above the electrode group 3. Then, the positive electrode lead 9L is connected to an inner surface of a sealing plate 15 on which a terminal part 25, a gasket 27, a connection plate 29, and an insulating plate 35 are provided, and the negative electrode lead 11L is connected to a lower surface of the connection plate 29. Subsequently, an opening 1a of the battery case 1 is sealed. Specifically, the sealing plate 15 is arranged in the opening 1a of the battery case 1. Then, the sealing plate 15 is welded to the periphery of the opening 1a of the battery case 1, and an electrolyte is injected through an electrolyte injection hole 15a. After the injection is completed, a plug 19 is fitted into the electrolyte injection hole 15a, and the periphery of a metal part 21 is laser-welded to the sealing plate 15. As described above, the rectangular battery of the present embodiment is produced.

Note that the present embodiment may have the following configurations.

When the battery case 1 is deformed due to the pressure application, if the battery case 1 and the connection plate 29 come into contact with each other before the electrode group 3 is deformed, the same advantages as those of the present embodiment can be realized. Thus, the distance between the battery case 1 and the connection plate 29 in the long-side direction may be equal to or less than the half of the internal case thickness. Consequently, part of the battery case 1 may be recessed toward the inner side in the long-side direction such that the distance between the battery case 1 and the connection plate 29 is equal to or less than the half of the internal case thickness. This will be described later in a second embodiment.

The connection plate 29 may be a flat plate or a plate having a step. If the connection plate 29 has the step, the connection plate 29 preferably has a configuration which will be described later in a first variation.

The connection plate 29 may be formed of a single plate, or may be formed by electrically connecting two or more connection pieces. If the connection plate 29 is formed of two or more connection pieces, the connection plate 29 preferably has the configuration which will be described later in the first variation.

The first end surface 35A of the insulating plate 35 may be flush with the first end surface 29A of the connection plate 29, or may be arranged on the outer side in the long-side direction relative to the first end surface 29A of the connection plate 29. However, in order to prevent the overheating of the battery due to the pressure application, the first end surface 35A of the insulating plate 35 is preferably arranged on the inner side in the long-side direction relative to the first end surface 29A of the connection plate 29 as in the present embodiment. In addition, in order to prevent the battery case 1 and the connection plate 29 from accidentally contacting each other due to the vibration during, e.g., the transport, the insulating plate 35 preferably covers the first end surface 29A of the connection plate 29. This will be described later in second to fourth variations.

The connection plate 29 may extend from a side slightly closer to the explosion-proof valve 17 than the terminal part 25 is, toward the outer side in the long-side direction beyond the electrolyte injection hole 15a, or may extend from the outer side in the long-side direction relative to the explosion-proof valve 17, toward the outer side in the long-side direction beyond the electrolyte injection hole 15a. This will be described later in fifth and sixth variations.

(First Variation)

Figure 6:
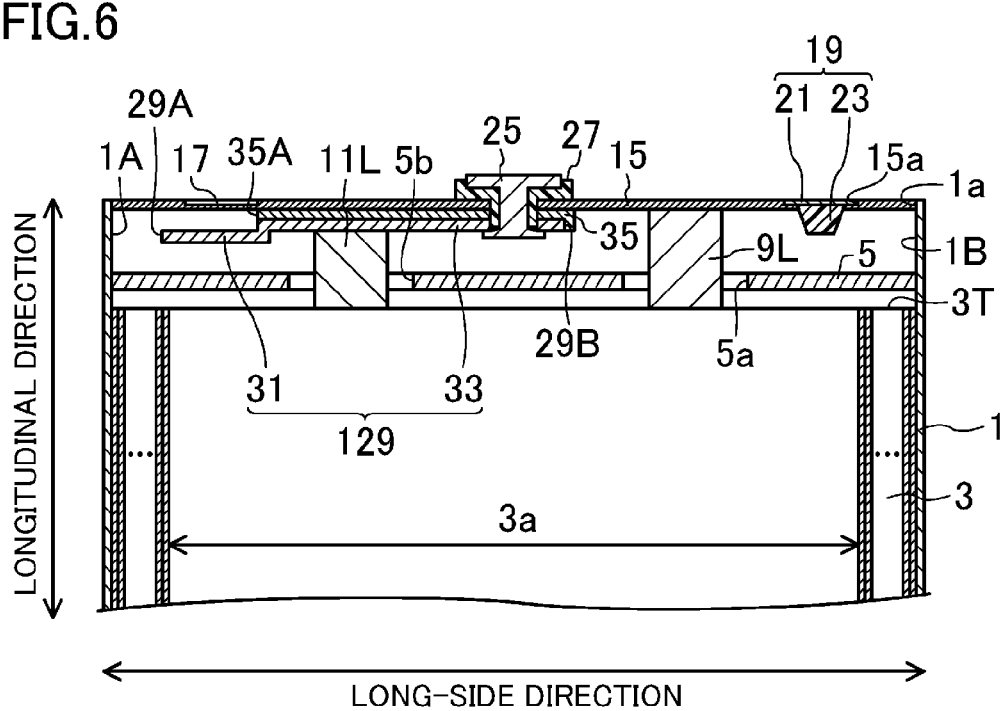
FIG. 6 is a longitudinal sectional view of a rectangular battery of a first variation of the first embodiment of the present invention.
Figure 7:
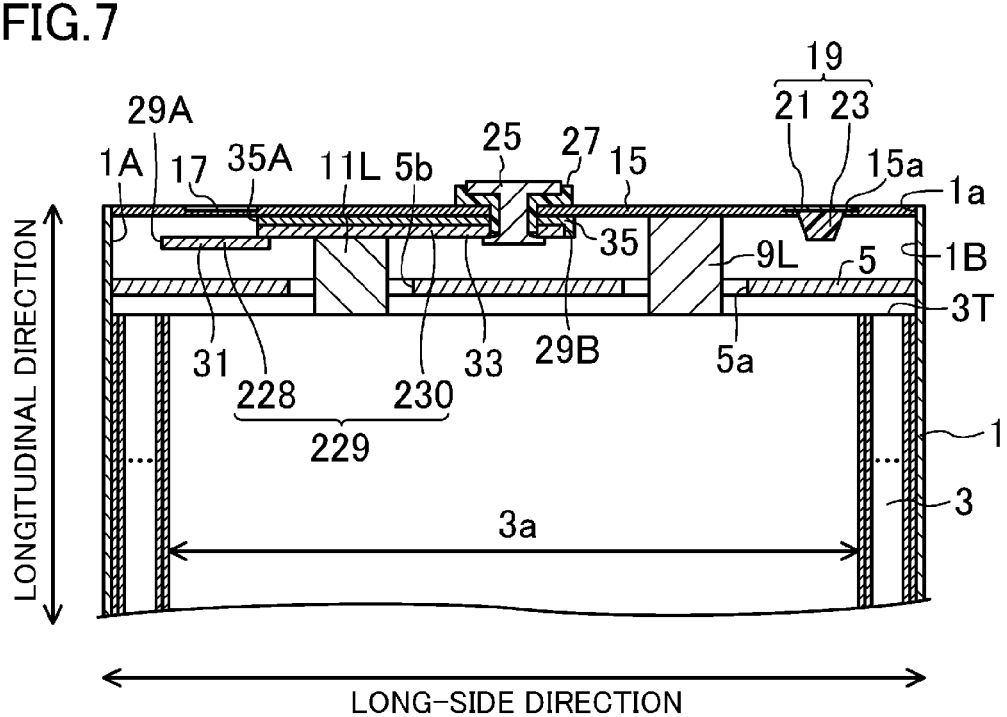
FIG. 7 is a longitudinal sectional view of another rectangular battery of the first variation of the first embodiment of the present invention.

FIGS. 6 and 7 are longitudinal sectional views of a rectangular battery of the first variation.

In each of connection plates 129, 229 of the present variation, an exposed part 31 is positioned closer to an electrode group 3 (an inner side in a longitudinal direction) than a covered part 33 is. Thus, a distance between a sealing plate 15 and the exposed part 31 in the longitudinal direction is greater in the present variation than in the first embodiment, thereby preventing accidental contact between the sealing plate 15 and the exposed part 31 due to vibration during, e.g., transport. Consequently, in the present variation, an advantage that occurrence of internal short-circuit can be prevented during, e.g., the transport can be also realized in addition to the advantages of the first embodiment.

The connection plate 129 illustrated in FIG. 6 is produced by bending a single plate member. In the connection plate 229 illustrated in FIG. 7, a first connection piece 228 and a second connection piece 230 are electrically connected together. The first connection piece 228 serves as the exposed part 31, and the second connection piece 230 serves as the covered part 33.

Note that each of the connection plates 129, 229 may have two or more step parts, or may be formed by connecting three or more connection pieces.

(Second Variation)

Figure 8:
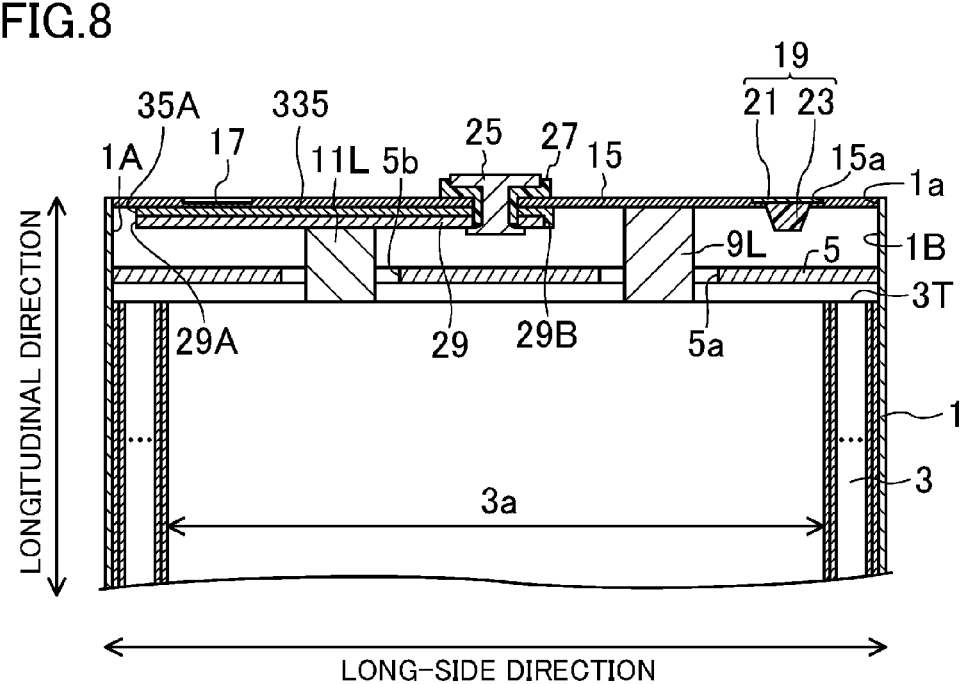
FIG. 8 is a longitudinal sectional view of a rectangular battery of a second variation of the first embodiment of the present invention.

FIG. 8 is a longitudinal sectional view of a rectangular battery of the second variation.

In the present variation, a first end surface 35A of an insulating plate 335 is flush with a first end surface 29A of a connection plate 29. Thus, the insulating plate 335 covers the entirety of an upper surface of the connection plate 29, thereby preventing accidental contact between a sealing plate 15 and the connection plate 29 due to vibration during, e.g., transport. Consequently, in the present variation, the same advantages as those of the first embodiment can be realized.

The first end surface 35A of the insulating plate 335 may protrude toward an outer side in a long-side direction relative to the first end surface 29A of the connection plate 29.

Part of the connection plate 29 positioned below an explosion-proof valve 17 and part (part corresponding to the exposed part 31 in the first embodiment) of the connection plate 29 positioned on the outer side in the long-side direction relative to the explosion-proof valve 17 may be positioned on an inner side in a longitudinal direction relative to part (part corresponding to the covered part 33 in the first embodiment) of the connection plate 29 other than the foregoing parts. In addition, in the connection plate 29, the part of the connection plate 29 positioned below the explosion-proof valve 17 and the part of the connection plate 29 positioned on the outer side in the long-side direction relative to the explosion-proof valve 17 may be each a connection piece different from a connection piece for the part of the connection plate 29 other than the foregoing parts. The same applies to the third and fourth variations which will be described later.

(Third Variation)

Figure 9:
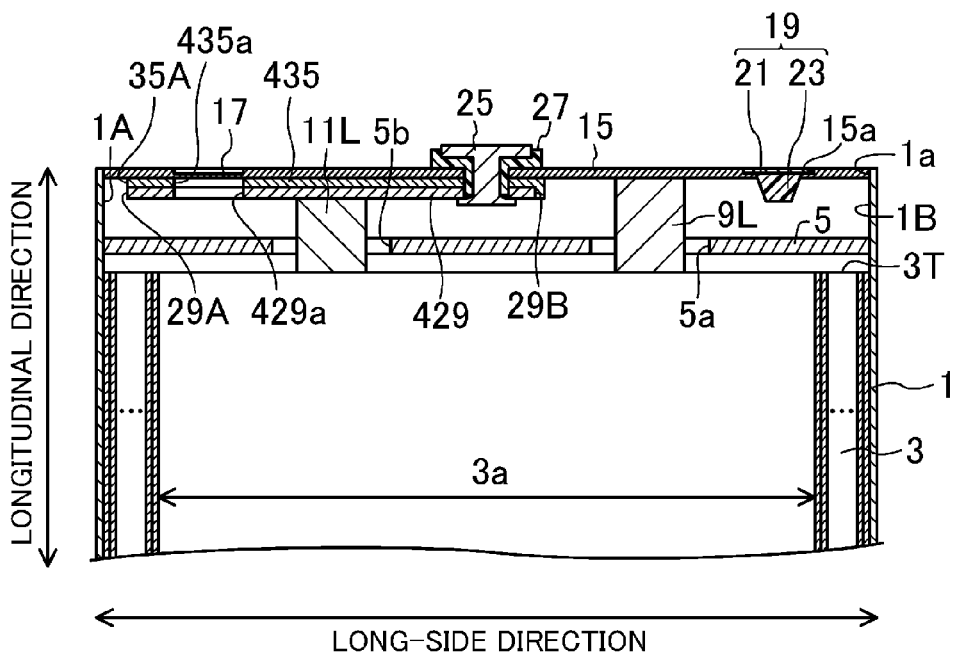
FIG. 9 is a longitudinal sectional view of a rectangular battery of a third variation of the first embodiment of the present invention.

FIG. 9 is a longitudinal sectional view of a rectangular battery of the third variation.

In the present variation, a first end surface 35A of an insulating plate 435 is flush with a first end surface 29A of a connection plate 429 as in the second variation. Through-holes (first holes) 429a, 435a reaching an explosion-proof valve 17 are formed respectively in the connection plate 429 and the insulating plate 435. Thus, when the internal pressure of the rectangular battery exceeds a predetermined value, the explosion-proof valve 17 is easily ruptured. Consequently, in the present variation, safety of the battery upon the increase in internal pressure of the rectangular battery can be ensured in addition to the advantages of the first and second variations.

Note that the diameter of each of the through-holes 429a, 435a may be equal to or less than the length of the explosion-proof valve 17 in a long-side direction, or may be equal to or greater than the length of the explosion-proof valve 17 in the long-side direction. However, if the diameter of each of the through-holes 429a, 435a is equal to or greater than the length of the explosion-proof valve 17 in the long-side direction, the safety of the battery upon the increase in internal pressure of the rectangular battery can be further ensured as compared to the case where the diameter of each of the through-holes 429a, 435a is equal to or less than the length of the explosion-proof valve 17 in the long-side direction.

(Fourth Variation)

Figure 10:
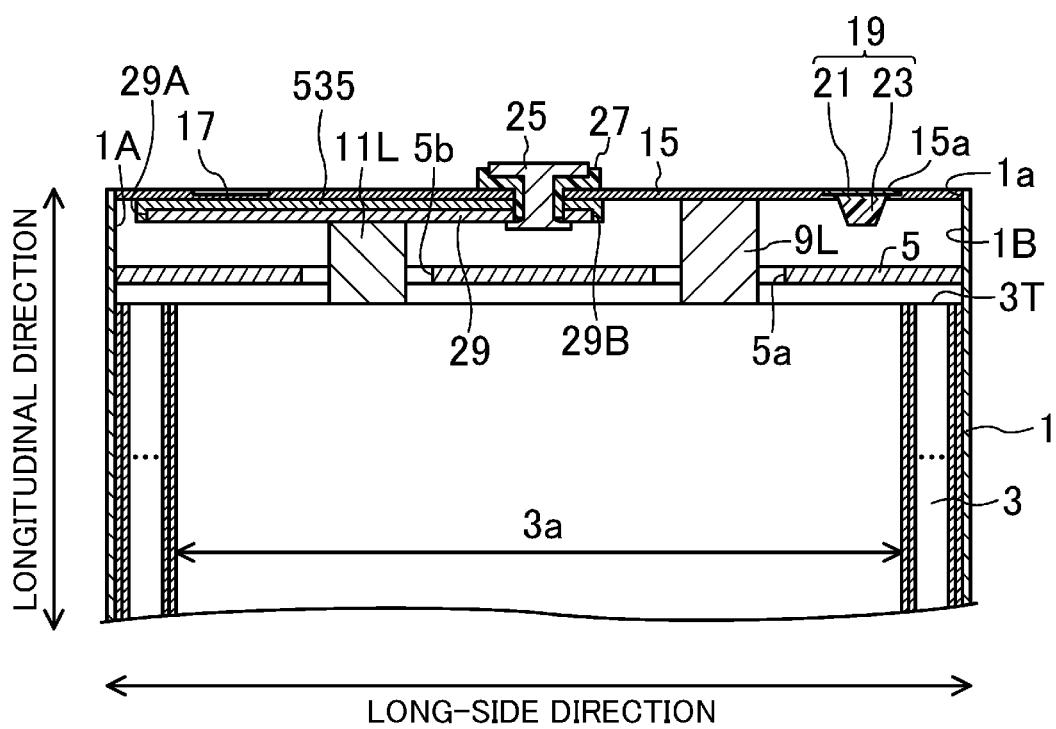
FIG. 10 is a longitudinal sectional view of a rectangular battery of a fourth variation of the first embodiment of the present invention.

FIG. 10 is a longitudinal sectional view of a rectangular battery of the fourth variation.

In the present variation, an insulating plate 535 covers not only a second end surface 29B of a connection plate 29, but also the entirety of an upper surface of the connection plate 29 and a first end surface 29A of the connection plate 29. Thus, accidental contact between a first inner surface 1A of a battery case 1 and the first end surface 29A of the connection plate 29 due to vibration during, e.g., transport can be further prevented as compared to the second variation.

When the battery case 1 is deformed by great pressure applied to the rectangular battery of the present variation, the insulating plate 535 is ruptured by such pressure on the first end surface 29A of the connection plate 29, and therefore the first inner surface 1A of the battery case 1 and the first end surface 29A of the connection plate 29 come into contact with each other. Thus, even if the first end surface 29A of the connection plate 29 is covered by the insulating plate 535, the advantages of the first embodiment can be realized. As described above, in the present variation, an advantage that occurrence of internal short-circuit during, e.g., the transport can be prevented can be realized in addition to the advantages of the first embodiment.

(Fifth Variation)

Figure 11:
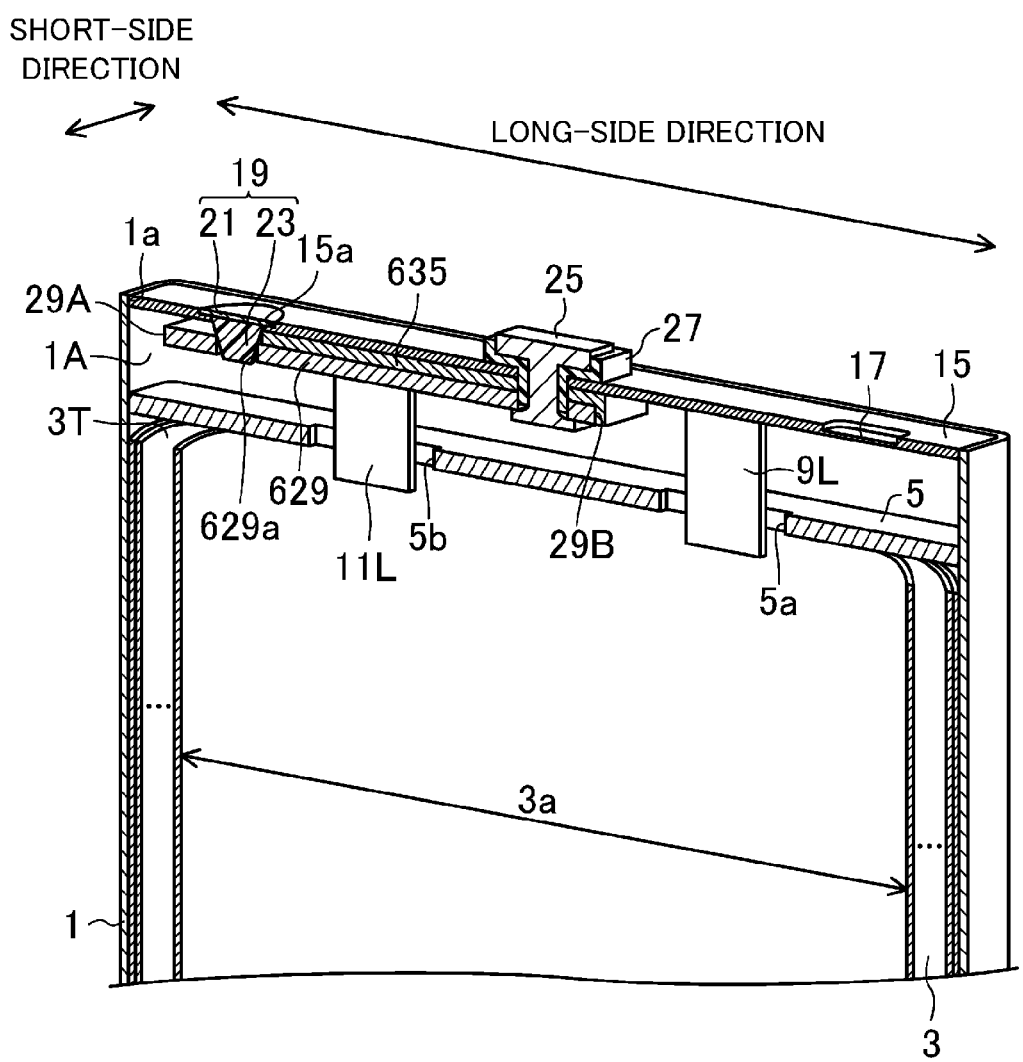
FIG. 11 is a longitudinal sectional perspective view of a rectangular battery of a fifth variation of the first embodiment of the present invention.
Figure 12:
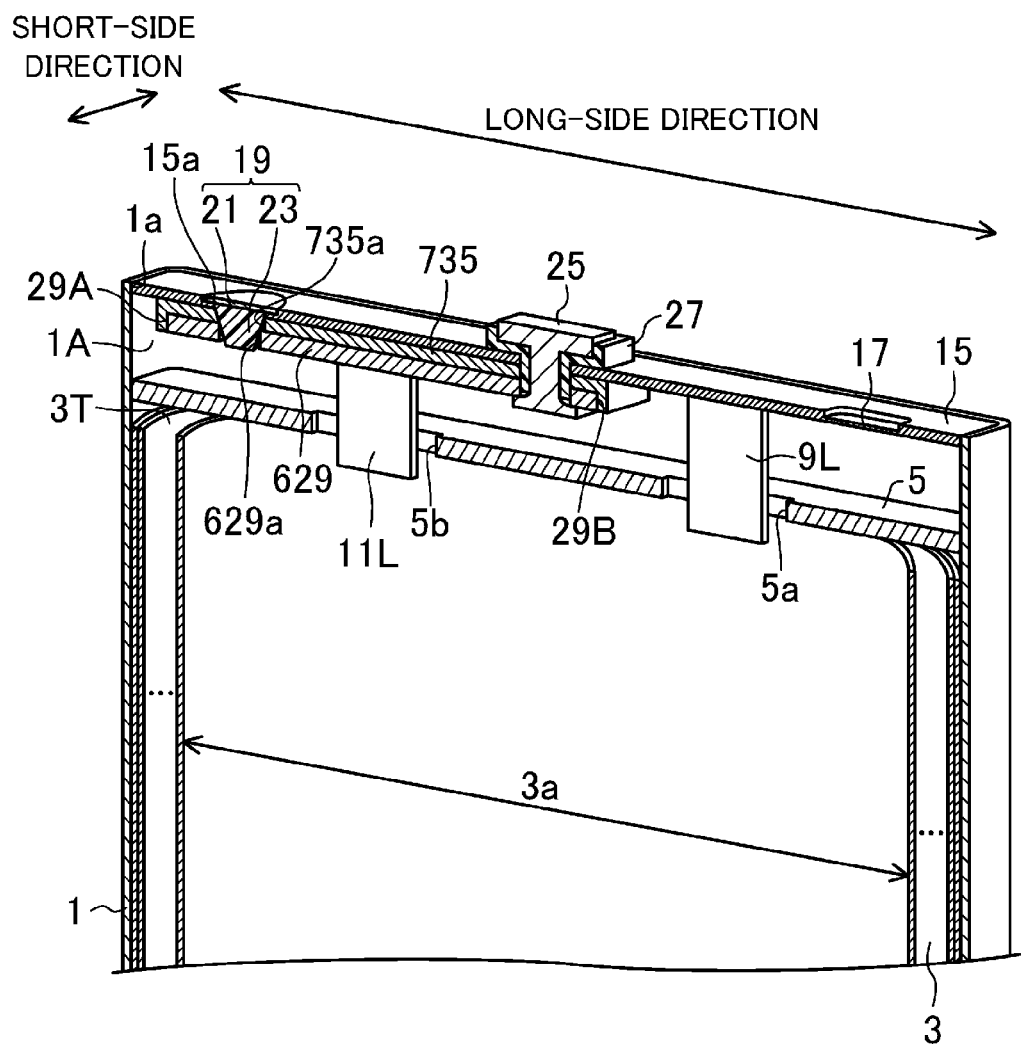
FIG. 12 is a longitudinal sectional perspective view of another rectangular battery of the fifth variation of the first embodiment of the present invention.

FIGS. 11 and 12 are longitudinal sectional perspective views of a rectangular battery of the fifth variation.

In the present variation, a connection plate 629 extends from a side slightly closer to an explosion-proof valve 17 than a terminal part 25 is, toward an outer side in a long-side direction beyond a plug 19. A first end surface 29A of the connection plate 629 is positioned at the substantially same position as that of the periphery of a hollow part 3a of an electrode group 3 or on the outer side in the long-side direction relative to the hollow part 3a of the electrode group 3. Thus, when a battery case 1 is deformed due to pressure application, a first inner surface 1A of the battery case 1 and the first end surface 29A of the connection plate 629 come into contact with each other before the electrode group 3 is deformed across the entirety thereof, and therefore the advantages of the first embodiment can be realized.

In the connection plate 629, a through-hole (second hole) 629a is formed, into which a resin part 23 of the plug 19 is inserted. Thus, the plug 19 can be held by the connection plate 629, and electrical insulation between the sealing plate 15 and the connection plate 629 can be maintained.

An insulating plate 635 illustrated in FIG. 11 extends from the side slightly closer to the explosion-proof valve 17 than the terminal part 25 is, toward an inner side in the long-side direction relative to the plug 19. An insulating plate 735 illustrated in FIG. 12 covers the entirety of an upper surface of the connection plate 629 and the first end surface 29A and a second end surface 29B of the connection plate 629. In the insulating plate 735, a through-hole 735a is formed, into which the resin part 23 of the plug 19 is inserted. Thus, occurrence of internal short-circuit during, e.g., transport can be prevented as in the fourth variation.

Note that the connection plate 629 may be formed by connecting two or more connection pieces together, and may have a step part.

A first end surface of an insulating plate may be flush with the first end surface 29A of the connection plate 629. Thus, the advantages of the second variation can be realized.

(Sixth Variation)

Figure 13:
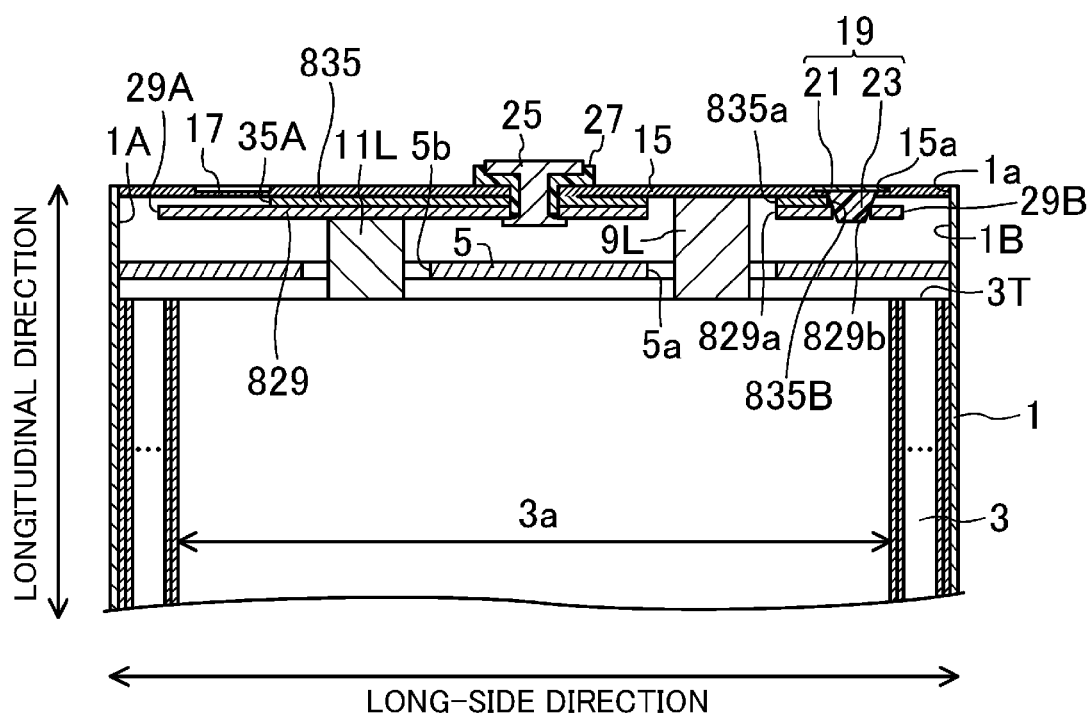
FIG. 13 is a longitudinal sectional view of a rectangular battery of a sixth variation of the first embodiment of the present invention.

FIG. 13 is a longitudinal sectional view of a rectangular battery of the sixth variation.

In the present variation, a connection plate 829 extends from an outer side in a long-side direction relative to an explosion-proof valve 17, toward the outer side in the long-side direction beyond a plug 19. In other words, not only a first end surface 29A but also a second end surface 29B of the connection plate 829 are positioned on the outer side in the long-side direction relative to a hollow part 3a of an electrode group 3 or at the substantially same position as that of the periphery of the hollow part 3a. Thus, when great pressure which can deform a battery case 1 is applied to the battery, a first inner surface 1A of the battery case 1 and the first end surface 29A of the connection plate 829 come into contact with each other, and a second inner surface 1B of the battery case 1 and the second end surface 29B of the connection plate 829 come into contact with each other. Consequently, in the present variation, overheating of the rectangular battery can be further prevented as compared to the first embodiment.

In the connection plate 829, a through-hole 829a is formed, into which a positive electrode lead 9L is inserted. This avoids contact between the positive electrode lead 9L and the connection plate 829. In addition, in the connection plate 829, a through-hole 829b is formed, into which a resin part 23 of a plug 19 is inserted. Thus, the plug 19 can be held by the connection plate 829, and electrical insulation between a sealing plate 15 and the connection plate 829 can be ensured.

In an insulating plate 835, a through-hole 835a is formed, into which the positive electrode lead 9L is inserted. A first end surface 35A of the insulating plate 835 may be positioned on the inner side in the long-side direction relative to the first end surface 29A of the connection plate 829 as illustrated in FIG. 13, or may be flush with the first end surface 29A of the connection plate 829. In addition, a second end surface 835B of the insulating plate 835 may be positioned on the inner side in the long-side direction relative to the second end surface 29B of the connection plate 829 as illustrated in FIG. 13, or may be flush with the second end surface 29B of the connection plate 829. Further, the insulating plate 835 may cover the first end surface 29A and the second end surface 29B of the connection plate 829. An advantage realized by changing the length of the insulating plate is as described in the second and fourth variations.

An exposed part of the connection plate 829 may be positioned on the inner side in the long-side direction relative to a covered part of the connection plate 829. In addition, the exposed part of the connection plate 829 may be configured by a connection piece different from a connection piece for the covered part of the connection plate 829. This realizes the same advantages as those of the first variation.

<<Second Embodiment>>

Figure 14:
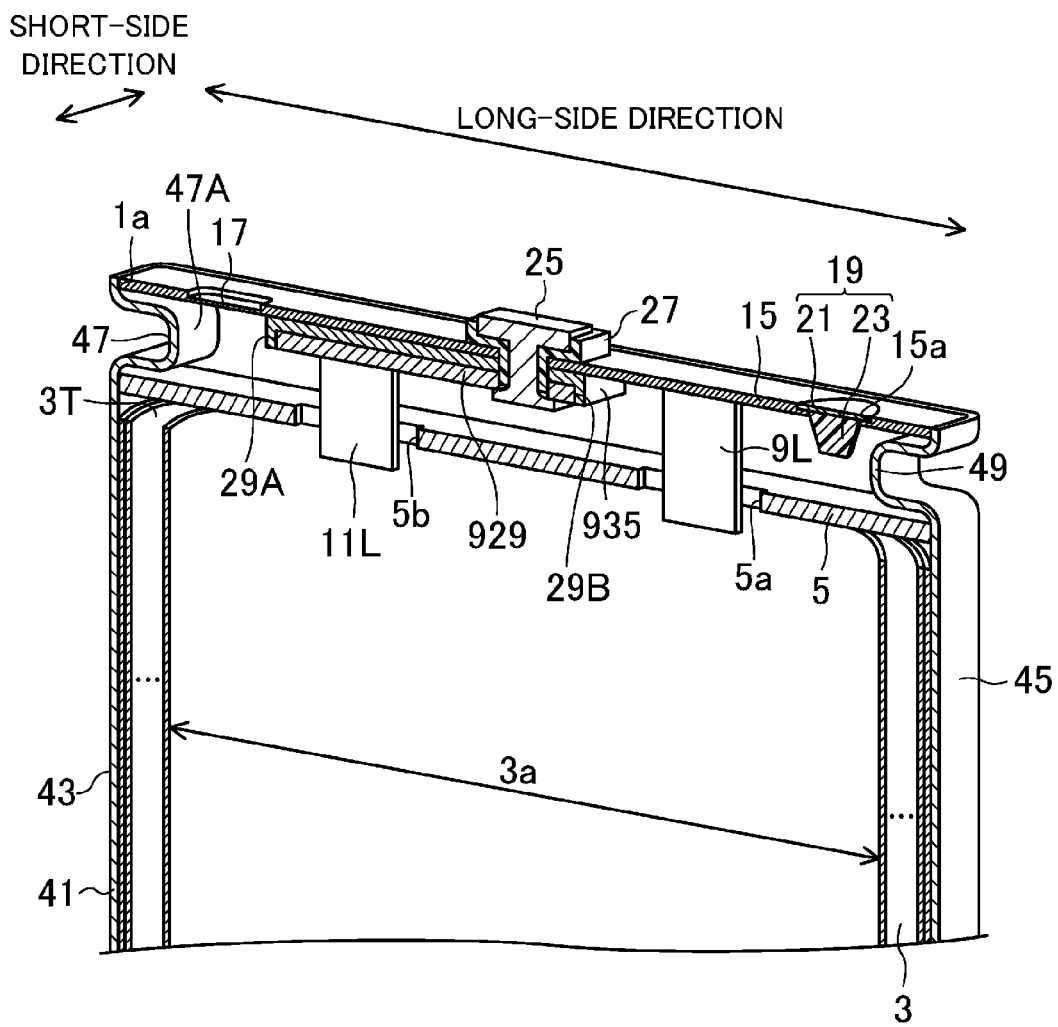
FIG. 14 is a longitudinal sectional perspective view of a rectangular battery of a second embodiment of the present invention.

FIG. 14 is a longitudinal sectional perspective view of a rectangular battery of the second embodiment of the present invention.

In the present embodiment, a first end surface 29A of a connection plate 929 is positioned on an inner side in a long-side direction relative to the periphery of a hollow part 3a of an electrode group 3, and part of a side wall (first side wall 43) of a battery case 41 protrudes toward the inner side in the long-side direction, i.e., toward the first end surface 29A of the connection plate 929. Differences from the first embodiment will be mainly described below.

The battery case 41 has the first side wall 43 extending in a long-side direction. A first recess (protrusion portion) 47 is formed in the first side wall 43. The first recess 47 is formed on a side closer to an opening 1a of the battery case 41 relative to an opening-side end surface 3T of the electrode group 3, and is recessed toward the inner side in the long-side direction, i.e., toward the first end surface 29A of the connection plate 929. An inner surface 47A of the first recess 47 faces the first end surface 29A of the connection plate 929, and a distance between the inner surface 47A of the first recess 47 and the first end surface 29A of the connection plate 929 in the long-side direction is equal to or less than the half of an internal case thickness. As described above, in the present embodiment, the distance between the inner surface 47A of the first recess 47 and the first end surface 29A of the connection plate 929 in the long-side direction is equal to or less than the thickness of the electrode group 3 in the long-side direction, Thus, when the battery case 41 is deformed due to pressure application, the inner surface 47A of the first recess 47 and the first end surface 29A of the connection plate 929 come into contact with each other before the electrode group 3 is deformed across the entirety thereof. Consequently, internal short-circuit occurs between the inner surface 47A of the first recess 47 and the first end surface 29A of the connection plate 929 before internal short-circuit occurs in the electrode group 3. This prevents overheating of the battery.

The first recess 47 is provided on the side closer to the opening 1a of the battery case 41 relative to the opening-side end surface 3T of the electrode group 3, i.e., the first recess 47 is provided in a dead space. Thus, narrowing of an accommodation space of the electrode group 3 in the battery case 41 due to formation of the first recess 47 can be prevented. Consequently, in the present embodiment, the dead space can be effectively used as in the first embodiment, thereby preventing a decrease in capacity of the rectangular battery.

As described above, in the present embodiment, since the distance between the inner surface 47A of the first recess 47 and the first end surface 29A of the connection plate 929 in the long-side direction is equal to or less than the half of the internal case thickness, the advantages similar to those of the first embodiment can be realized.

Note that the first end surface 29A of the connection plate 929 is covered by an insulating plate 935. However, as in the fourth variation, when great pressure which can deform the battery case 41 is applied to the rectangular battery, the insulating plate 935 is ruptured on the first end surface 29A of the connection plate 929, and therefore the inner surface 47A of the first recess 47 and the first end surface 29A of the connection plate 929 come into contact with each other. Thus, the same advantages as those of the first embodiment can be also realized in the present embodiment. In addition to the foregoing, as in the fourth variation, accidental contact between the inner surface 47A of the first recess 47 and the first end surface 29A of the connection plate 929 due to vibration during, e.g., transport can be prevented.

The present embodiment may have the following configurations.

A second side wall (side wall facing the first side wall 43) 45 does not necessarily have a second recess 49. However, if the connection plate extends from the inner side in the long-side direction relative to an explosion-proof valve 17, toward the inner side in the long-side direction relative to an electrolyte injection hole 15a, the second side wall 45 preferably has the second recess 49. Thus, as in the sixth variation, when great pressure which can deform the battery case 41 is applied to the battery, overheating of the battery can be further prevented as compared to the case illustrated in FIG. 14.

A first end surface (end surface facing the first side wall 43) of the insulating plate 935 may be positioned on the inner side in the long-side direction relative to the first end surface 29A of the connection plate 929, or may be flush with the first end surface 29A of the connection plate 929. The same applies to a seventh variation which will be described later.

The first recess 47 may be a protrusion as in the seventh variation.

(Seventh Variation)

Figures 15, 16:
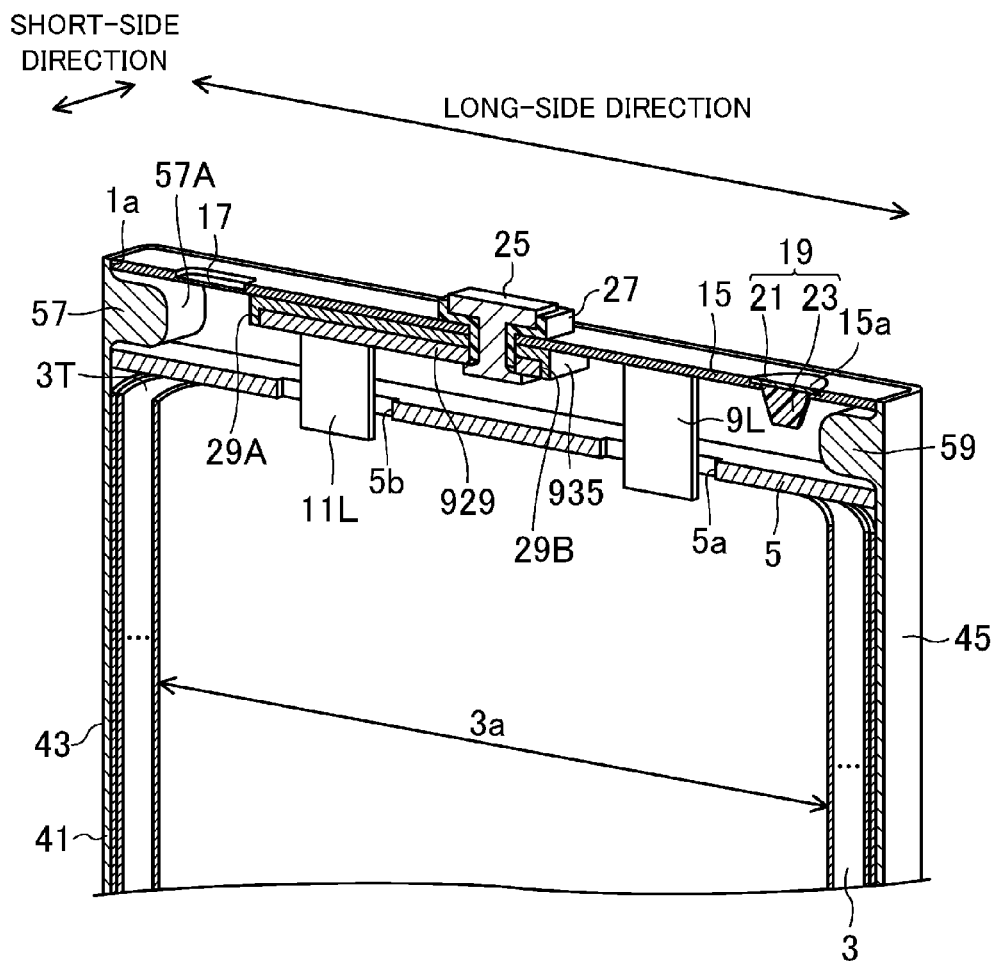
FIG. 15 is a longitudinal sectional perspective view of a rectangular battery of a seventh variation of the second embodiment of the present invention.
FIG. 16 is a table showing results of examples.

FIG. 15 is a longitudinal sectional perspective view of a rectangular battery of the seventh variation.

In the present variation, a first side wall 43 has a first protrusion 57. The first protrusion (protrusion portion) 57 is formed on a side closer to an opening 1a of a battery case 41 relative to an opening-side end surface 3T of an electrode group 3, and protrudes toward an inner side in a long-side direction, i.e., toward a first end surface 29A of a connection plate 929. An inner surface 57A of the first protrusion 57 faces the first end surface 29A of the connection plate 929, and a distance between the inner surface 57A of the first protrusion 57 and the first end surface 29A of the connection plate 929 in the long-side direction is equal to or less than the half of an internal case thickness. Thus, when the battery case 41 is deformed due to pressure application, the inner surface 57A of the first protrusion 57 and the first end surface 29A of the connection plate 929 come into contact with each other before the electrode group 3 is deformed across the entirety thereof. Thus, internal short-circuit occurs between the inner surface 57A of the first protrusion 57 and the first end surface 29A of the connection plate 929 before internal short-circuit occurs in the electrode group 3. Thus, in the present variation, the substantially same advantages as those of the second embodiment can be realized.

Note that, in the present variation, a second side wall 45 does not necessarily have a second protrusion 59. However, if the connection plate extends from the inner side in the long-side direction relative to an explosion-proof valve 17, toward the inner side in the long-side direction relative to an electrolyte injection hole 15a, the second side wall 45 preferably has the second protrusion 59. Thus, as in the sixth variation, when great force which can deform the battery case 41 is applied to the battery, overheating of the battery can be further prevented as compared to the case illustrated in FIG. 15.

<<Other Embodiment>>

Each of the first and second embodiments and the first to seventh variations may have the following configurations.

Any one of the first embodiment and the first to sixth variations may be combined with any one of the second embodiment and the seventh variation.

The sealing plate may seal the opening of the battery case through the gasket, and the terminal part may be provided on the sealing plate without the gasket being interposed between the terminal part and the sealing plate. In such a case, the sealing plate and the battery case have different polarities, and the sealing plate and the terminal part has the same polarity.

The positive electrode and the negative electrode may be positioned opposite to those described in the foregoing. In such a case, the battery case, the sealing plate, the lead connected to the sealing plate, and the metal part of the plug may be made of, e.g., nickel, copper, iron, or stainless. In addition, the terminal part, the connection plate, and the lead connected to the connection plate may be made of, e.g., metal such as aluminum or an aluminum alloy.

The positive electrode lead and the negative electrode lead may be drawn from a bottom end surface of the electrode group, or may be drawn respectively from different end surfaces of the electrode group.

The electrolyte injection hole may be formed in a side wall of the battery case.

The explosion-proof valve and the electrolyte injection hole are positioned on the inner side in the long-side direction relative to the periphery of the hollow part of the electrode group. However, the explosion-proof valve and the electrolyte injection hole may be positioned on the outer side in the long-side direction relative to the periphery of the hollow part.

The resin part of the plug may have a substantially uniform width in the longitudinal direction. In addition, in the resin part of the plug, a surface of a member made of a conductive material may be coated with resin.

The rectangular battery is not limited to a lithium ion secondary battery, and may be an alkaline secondary battery, an alkaline battery, or a lithium primary battery.

EXAMPLES

In the present examples, lithium ion secondary batteries were produced in accordance with the following methods, and a safety test was conducted for the lithium ion secondary batteries.

1. Method for Producing Lithium Ion Secondary Battery

First Example (a) Production of Positive Electrode

As a positive electrode active material, lithium cobalt oxide ($LiCoO_2$) having an average particle size of 10 μm was used. The followings were mixed together to form a positive electrode mixture paste: 100 parts by mass of the positive electrode active material; 8 parts by mass of poly(vinylidene fluoride) (PVDF as a binder); 3 parts by mass of acetylene black (conductive agent); and a proper amount of N-methylpyrrolidone (NMP).

The positive electrode mixture paste was applied to both surfaces of aluminum foil (positive electrode current collector) having a length of 420 mm, a width of 42 mm, and a thickness of 15 µm, and then was dried. In such a manner, a positive electrode active material layer having a thickness of 65 µm was formed on each of the surfaces of the aluminum foil. In such a state, the aluminum foil is exposed through part of the produced positive electrode in a longitudinal direction.

One end of a lead (positive electrode lead) having a length of 30 mm, a width of 3 mm, and a thickness of 0.1 mm and made of aluminum was ultrasonic-welded to the exposed part of the aluminum foil.

(b) Production of Negative Electrode

As a negative electrode active material, artificial graphite having an average particle size of 20 µm was used. The followings were mixed together to form a negative electrode mixture paste: 100 parts by mass of the negative electrode active material; 1 part by mass of a styrene-butadiene copolymer (binder named BM-400B manufactured by Zeon Corporation); 1 part by mass of carboxymethyl cellulose (thickener); and a proper amount of water.

The negative electrode mixture paste was applied to both surfaces of copper foil (negative electrode current collector) having a length of 400 mm, a width of 44 mm, and a thickness of 10 µm, and then was dried. In such a manner, a negative electrode active material layer having a thickness of 70 µm was formed on each of the surfaces of the copper foil. In such a state, the copper foil is exposed through part of the produced negative electrode in the longitudinal direction.

One end of a lead (negative electrode lead) having a length of 30 mm, a width of 3 mm, and a thickness of 0.1 mm and made of nickel was ultrasonic-welded to the exposed part of the copper foil.

(c) Formation of Non-Aqueous Electrolyte $LiPF_6$ (substance to be dissolved) was dissolved at a concentration of 1.0 mol/L in a mixture solvent containing ethylene carbonate and ethyl methyl carbonate at a volume ratio of 1:4. In such a manner, a non-aqueous electrolyte was formed.

(d) Production of Battery

A rectangular battery was produced as follows.

First, an electrode group was produced. A positive electrode plate and a negative electrode plate were arranged such that the leads protrude in the same direction, and a microporous film (porous insulator manufactured by Asahi Kasei Corporation) having a thickness of 20 µm and made of polyethylene was interposed between the positive electrode plate and the negative electrode plate. The positive electrode plate, the negative electrode plate, and the microporous film made of polyethylene were wounded around a flat plate such that the lead made of aluminum constitutes the last wound end and the lead made of nickel constitutes the first wound end.

Next, a sealing structure was produced. A connection plate made of iron and plated with nickel was arranged on one surface of a sealing plate made of aluminum in the state in which an insulating plate made of PPS is interposed between the connection plate and the sealing plate. In such a state, a through-hole formed at the center of the sealing plate in the longitudinal direction, a through-hole formed in the insulating plate, and a through-hole formed in the connection plate communicate with each other. In addition, the connection plate extends toward an outer side in the longitudinal direction of the sealing plate relative to an explosion-proof valve provided in the sealing plate. Then, a terminal part made of iron and plated with nickel was fixed into the through-holes communicating with each other, through a gasket made of PFA.

After the produced electrode group was accommodated in a battery case, an opening of the battery case was sealed by the produced sealing structure. Specifically, the produced electrode group was first accommodated in the battery case (having a thickness of 300 µm), and then an upper insulating plate was arranged above the electrode group. In such a state, a bottom part of the battery case is in a rectangular shape as viewed in the plane, and the battery case opens at an upper end thereof. Next, the positive electrode lead and the negative electrode lead were inserted respectively into through-holes formed in the upper insulating plate, and the sealing plate on which the connection plate, the insulating plate, and the terminal part are provided was arranged on an opening side of the battery case. Subsequently, an end of the positive electrode lead was laser-welded to an inner surface of the sealing plate, and an end of the negative electrode lead was laser-welded to a lower surface of the connection plate. Then, the sealing plate was laser-welded to the periphery of the opening of the battery case to close the opening of the battery case, and the non-aqueous electrolyte of 2.5 g was injected into the battery case through an electrolyte injection hole of the sealing plate. The electrolyte injection hole was closed with a plug including a metal part made of aluminum and a resin part made of EPDM. In the foregoing manner, a rectangular lithium secondary battery was produced, which has a thickness of 5.2 mm, a height of 50 mm, a width of 34 mm, and a design capacity of 900 mAh. In the produced rectangular lithium secondary battery, a first end surface of the connection plate is positioned on an outer side in a long-side direction relative to the hollow part of the electrode group.

Second Example

A rectangular lithium secondary battery of a second example was produced in the similar manner to that of the first example, except that the connection plate illustrated in FIG. 13 was used. That is, in the rectangular lithium secondary battery of the second example, not only a first end surface but also a second end surface of the connection plate are positioned on an outer side in a long-side direction relative to a hollow part of an electrode group.

Third Example

A rectangular lithium secondary battery of a third example was produced in the similar manner to that of the first example, except that the connection plate and the battery case illustrated in FIG. 14 were used. That is, in the rectangular lithium secondary battery of the third example, a first end surface of the connection plate is positioned on an inner side in a long-side direction relative to the periphery of a hollow part of an electrode group. A recess recessed toward the inner side in the long-side direction is formed in part of a first side wall of the battery case facing the first end surface of the connection plate. A distance between an inner surface of the recess in the long-side direction and the first end surface of the connection plate is equal to or less than the half of an internal case thickness.

Fourth Example

A rectangular lithium secondary battery of a fourth example was produced in the similar manner to that of the first example, except that the connection plate illustrated in FIG.

11 was used. That is, in the rectangular lithium secondary battery of the fourth example, a first end surface of the connection plate is positioned on an outer side in a long-side direction relative to a plug, and a resin part of the plug is inserted into the connection plate.

Comparative Example

A rectangular lithium secondary battery of a comparative example was produced in the similar manner to that of the first example, except that the connection plate and the battery case illustrated in FIG. 3 were used. That is, in the rectangular lithium secondary battery of the comparative example, first and second end surfaces of the connection plate are positioned on an inner side in a long-side direction relative to the periphery of a hollow part of an electrode group. In addition, first and second inner surfaces of the battery case are flat surfaces.

2. Safety Test

Ten batteries were prepared for each of the first to fourth examples and the comparative example, and the following evaluation was conducted.

At an environmental temperature of 25° C., the battery was subjected to a constant current charge at current of 0.7 C until voltage reaches 4.2 V, and then was subjected to a constant current charge at voltage of 4.2 V until current drops to 0.05 C. Subsequently, at an environmental temperature of 25° C., first and second side walls of the rectangular lithium secondary battery were pressed with force of 13 kN at a velocity of 3 mm/second by flat plates made of SUS. Then, the surface temperature of the battery was measured after the lapse of 5 seconds since internal short-circuit occurred. Results are illustrated in FIG. 16.

3. Considerations

Referring to FIG. 16, the surface temperature of the battery is lower in the first to fourth examples than in the comparative example. Among the first to fourth examples, the surface temperature of the battery of the second example is lower than those of other examples. As in the foregoing, it has been found that the batteries of the first to fourth examples have excellent safety.

INDUSTRIAL APPLICABILITY

In the present invention, the safety of the rectangular battery can be improved. Thus, the rectangular battery of the present invention is useful as a power source for portable electronic devices such as personal computers, portable phones, mobile devices, personal digital assistants (PDAs), portable game devices, or video cameras. In addition, it is expected to use the rectangular battery of the present invention as, e.g., a secondary battery for assisting an electric motor of a hybrid electric automobile, fuel-cell-powered automobile, etc., a power source for driving an electric tool, a vacuum, a robot, etc., or a power source for a plug-in hybrid electric vehicle (plug-in HEV).

DESCRIPTION OF REFERENCE CHARACTERS

1 Battery Case
1A First Inner Surface
1a Opening
Electrode Group
3a Hollow Part
9 Positive Electrode Plate
9L Positive Electrode Lead
11 Negative Electrode Plate
11L Negative Electrode Lead
13 Porous Insulator
15 Sealing Plate
15a Electrolyte injection hole
17 Explosion-Proof Valve
25 Terminal Part
27 Gasket
29 Connection Plate
29A First End Surface
31 Exposed Part
33 Covered Part
35 Insulating Plate
35A First End Surface
41 Battery Case
43 First Side Wall
First Recess
47A Inner Surface
57 First Protrusion
57A Inner Surface
228 First Connection Piece
230 Second Connection Piece
429a Through-Hole
629a Through-Hole

The invention claimed is:

1. A rectangular battery comprising a battery case accommodating, together with an electrolyte, an electrode group configured such that an electrode plate having a first polarity and an electrode plate having a second polarity are wounded with a porous insulator being interposed therebetween, wherein
  a lead connected to the electrode plate having the first polarity is connected to the battery case which is an external terminal having the first polarity,
  a lead connected to the electrode plate having the second polarity is, through a connection plate provided between a sealing plate sealing an opening of the battery case and the electrode group, connected to an external terminal provided on the sealing plate and having the second polarity,
  the battery case is in a rectangular shape as viewed in a cross section,
  a valve is provided in the sealing plate, the valve being thinner than the sealing plate,
  a distance between the battery case and the connection plate at at least one end of the battery case in a long-side direction thereof is equal to or less than a half of a width of the battery case in a short-side direction thereof,
  a first end surface of the connection plate is positioned on an outer side in the long-side direction relative to the valve, and a first hole reaching the valve is formed in the connection plate, and
  the battery case and the connection plate have different polarities.

2. The rectangular battery of claim 1, wherein
  a hollow part is formed in the electrode group, and
  the connection plate extends in the long-side direction, and has the first end surface positioned on the outer side in the long-side direction relative to the hollow part.

3. The rectangular battery of claim 2, wherein
  the sealing plate is connected to the battery case,
  the external terminal having the second polarity is provided on the sealing plate through a gasket,
  an insulating plate is provided between the sealing plate and the connection plate, and
  the first end surface of the connection plate is exposed from the insulating plate.

4. The rectangular battery of claim 3, wherein
an end surface of the insulating plate is positioned on the inner side in the long-side direction relative to the first end surface of the connection plate.

5. The rectangular battery of claim 4, wherein
the opening of the battery case is formed at one end of the battery case in a longitudinal direction thereof, and
an exposed part of the connection plate exposed from the insulating plate is positioned on an inner side in the longitudinal direction of the battery case relative to a covered part of the connection plate covered by the insulating plate.

6. The rectangular battery of claim 5, wherein
the connection plate is formed by connecting two or more connection pieces together, and
the exposed part and the covered part are provided respectively in the connection pieces different from each other.

7. The rectangular battery of claim 1, wherein
a side wall of the battery case extending in the short-side direction has a protrusion portion protruding toward an inner side in the long-side direction, and
a distance between the protrusion and the connection plate in the long-side direction is equal to or less than a half of the width of the battery case in the short-side direction.

8. The rectangular battery of claim 7, wherein
the protrusion is formed such that part of the side wall of the battery case is recessed toward the inner side in the long-side direction.

9. The rectangular battery of claim 1, wherein
the electrode plate having the first polarity is a positive electrode plate, and
the electrode plate having the second polarity is a negative electrode plate.

* * * * *